(12) United States Patent
Maeda et al.

(10) Patent No.: US 8,421,395 B2
(45) Date of Patent: Apr. 16, 2013

(54) SYNCHRONOUS MOTOR AND CONTROL METHOD OF SYNCHRONOUS MOTOR

(75) Inventors: Daisuke Maeda, Hitachinaka (JP); Kenji Sakurai, Hitachi (JP); Hiroyuki Hasegawa, Hitachi (JP); Hidefumi Shirahama, Hitachi (JP); Mitsuhiro Mishima, Tokai (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 389 days.

(21) Appl. No.: 12/420,154

(22) Filed: Apr. 8, 2009

(65) Prior Publication Data
US 2009/0256505 A1    Oct. 15, 2009

(30) Foreign Application Priority Data
Apr. 11, 2008  (JP) .................... 2008-103683

(51) Int. Cl.
   *H02P 3/18*        (2006.01)
(52) U.S. Cl.
   USPC .......................................... 318/705; 318/798
(58) Field of Classification Search .................. 318/705, 318/700, 432, 434, 798, 799, 801, 805, 807, 318/808
   See application file for complete search history.

(56) References Cited

U.S. PATENT DOCUMENTS

| | | | | |
|---|---|---|---|---|
| 4,879,502 A * | 11/1989 | Endo et al. | ..................... | 318/723 |
| 5,142,432 A * | 8/1992 | Schneider | ..................... | 361/91.3 |
| 5,194,370 A * | 3/1993 | Berninger et al. | ........... | 435/6.14 |
| 5,463,299 A * | 10/1995 | Futami et al. | .................. | 318/618 |
| 6,121,736 A * | 9/2000 | Narazaki et al. | .......... | 318/400.35 |
| 6,141,217 A * | 10/2000 | Nakahama et al. | ........... | 361/694 |
| 6,373,241 B1 * | 4/2002 | Weber et al. | ................ | 324/207.2 |
| 6,639,377 B2 * | 10/2003 | Iwaji et al. | ..................... | 318/700 |
| 7,030,526 B2 * | 4/2006 | Tsukamoto et al. | ............ | 310/90 |
| 7,180,212 B2 * | 2/2007 | Anwar et al. | ................ | 310/68 R |
| 7,224,133 B2 * | 5/2007 | Nakatsugawa et al. | .. | 318/400.01 |
| 7,619,385 B2 * | 11/2009 | Suzuki et al. | ................. | 318/705 |
| 7,839,113 B2 * | 11/2010 | Maeda et al. | ................. | 318/721 |
| 2006/0044848 A1 * | 3/2006 | Suzuki et al. | .................. | 363/37 |

FOREIGN PATENT DOCUMENTS

JP      2006-034086    2/2006

* cited by examiner

*Primary Examiner* — Rina Duda
(74) *Attorney, Agent, or Firm* — Antonelli, Terry, Stout & Kraus, LLP.

(57) ABSTRACT

A synchronous motor including therein a three-phase inverter and position sensors, having a unit for calculating a digital input current value from the analog output of an input current detection circuit that detects the input current flowing into the DC input terminal of the three-phase inverter, and a digital feedback speed control unit for adjusting the amplitudes and frequency of the AC voltages outputted from the three-phase inverter in such a manner that the motor speed calculated by a motor speed calculation unit 41 on the basis of the outputs of the position sensors approaches a speed command value received by a communication reception unit from outside the synchronous motor. The synchronous motor further includes therein a communication transmission unit for transmitting the input current value and the motor speed to outside the synchronous motor.

8 Claims, 20 Drawing Sheets

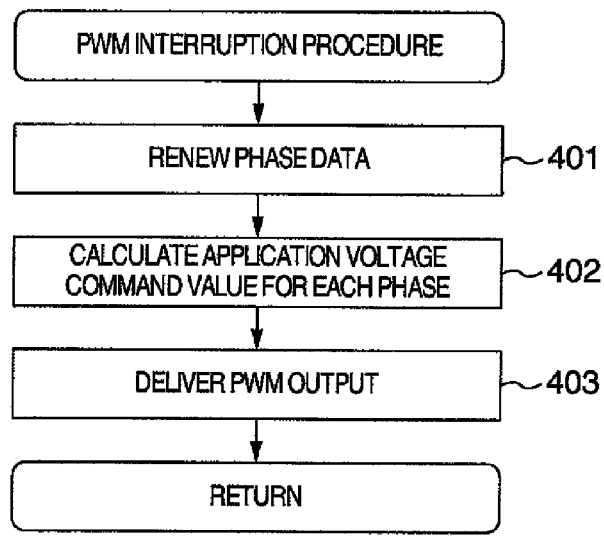
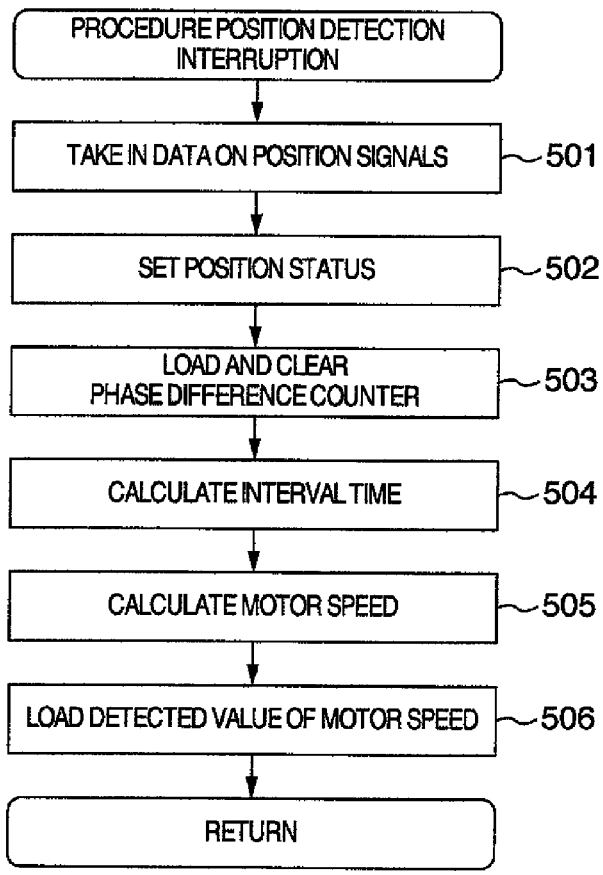

| POSITION STATUS | PHASE DIFFERENCE COUNTER |
|---|---|
| 0 | STORAGE AREA 0 IN PHASE DIFFERENCE COUNTER |
| 1 | STORAGE AREA 1 IN PHASE DIFFERENCE COUNTER |
| 2 | STORAGE AREA 2 IN PHASE DIFFERENCE COUNTER |
| 3 | STORAGE AREA 3 IN PHASE DIFFERENCE COUNTER |
| 4 | STORAGE AREA 4 IN PHASE DIFFERENCE COUNTER |
| 5 | STORAGE AREA 5 IN PHASE DIFFERENCE COUNTER |

SYNCHRONOUS MOTOR AND CONTROL METHOD OF SYNCHRONOUS MOTOR

BACKGROUND OF THE INVENTION

This invention relates to a synchronous motor for use in an air conditioner and a hot water supplier, and to a method for controlling the synchronous motor.

Synchronous motors have been used recently as fan motors for use in air conditioners and hot water suppliers since they can be controlled over a wide range of speeds, their energy consumption is economical, and they can be operated with low acoustic noise. Such a synchronous motor is usually driven by sinusoidal waves generated by a motor drive circuit installed in the housing of the synchronous motor.

Usually, a synchronous motor is provided with Hall ICs, which are inexpensive and simple in configuration, used as position sensors and an inverter main circuit. The Hall ICs detect the positions of the magnetic poles of the synchronous motor. The switching elements in the inverter main circuit are controlled on the basis of the information on the positions of the magnetic poles, and the synchronous motor is driven by the voltages applied to the windings of the motor as a result of the control of the switching elements. Communication between the synchronous motor and the external circuit is usually made by using a DC power source, a control voltage of about 15V, a GND voltage, a DUTY command, and a rotational speed pulse signal, all these items being handled as analog information. The DC power source, the control voltage, the GND voltage and the DUTY command are supplied from the external of the motor to the internal thereof. The rotational sped pulse signal is supplied from the internal of the motor to the external thereof. The DUTY command is a command for controlling the duty ratios of the ON/OFF signals which turn on or off the switching elements on the positive and negative sides of the respective phases of the inverter main circuit. The greater is the DUTY command, the higher is the voltage outputted from the inverter main circuit. Of the items supplied from the external of the motor to the internal thereof, the DUTY command may be used as a torque command and a speed command. In order to isolate the internal of the motor from the external thereof, the DUTY command and the rotational speed pulse signal are fed to the microcomputer external to the motor, via an insulating circuit which serves.

JP-A-2006-34086 discloses a conventional apparatus for driving a synchronous motor.

The conventional apparatus is energized by a DC power source. The current flowing from the DC power source into the motor is detected, and the current signal corresponding to the peak of the detected current is generated. Depending on the current signal and the externally inputted torque command signal (i.e. command signal for current value), the difference signal representative of the value equal to the torque command signal minus the current signal, is outputted. The position sensors deliver the position sensor signals having a constant phase relationship with respect to the voltages induced in the stator windings of plural phases in the motor. Sinusoidal wave signals are generated whose voltage values change periodically depending on the phases of the position sensor signals. The amplitudes of the sinusoidal wave signals are determined on the basis of the difference signal.

On the other hand, the phases of the phase currents flowing through the motor windings are detected, the phase difference between the position sensor signals and the current phase signals is detected, and the phases of the sinusoidal wave signals generated corresponding to the phases of the position sensor signals are corrected depending on the phase difference signal.

On the basis of the amplitudes and the phases of the thus obtained sinusoidal wave signals, the drive signal is generated through the well-known PWM control and then supplied to the gate drive circuit to drive the switching elements in the inverter.

Namely, according to the conventional synchronous motor driving apparatus disclosed in JP-A-2006-34086, the amplitudes of the voltages applied to the motor are determined in accordance with the difference between the current signal corresponding to the peak of the power source current and the externally inputted torque command. Then, in order to drive the motor, the phases of the voltages applied to the motor are determined in accordance with the difference in phase between the position sensor signals and the phase currents.

SUMMARY OF THE INVENTION

The DUTY command, the torque command and the speed command were usually analog signals. It was therefore difficult to detect them accurately due to switching surge and unevenness in the characteristics of the circuits for generating and detecting respective commands. Especially in the operating region of low rotational speeds where command values are small, there were problems that desired rotational speeds cannot be attained and that the rotational speed of motor fluctuates. Further, since rotational speed pulse signal was of analog quantity, a problem arose that the rotational speed of motor fluctuated so that the rotational speed was detected inaccurately.

Regarding the DUTY command and the torque command mentioned in JP-A-2006-34086, since the magnitudes of the voltages supplied to the motor changed in response to the variation of the DC voltage, the rotational speed of the motor changed so that the beats of 100 or 120 Hz created a problem of acoustic noise during operation and a problem of decreased efficiency due to load fluctuation.

Moreover, the number of the electrical connections between the internal of the motor and the external thereof was minimized to provide low cost, so that the information conveyed from the internal of the motor to the external thereof was only the rotational speed pulse signal. It was therefore difficult to detect from outside of the motor housing the condition of the motor and the condition of the load such as a fan attached to the motor. For example, it was difficult to detect from outside the motor housing the degree of the accumulation of dirt on the blades of a fan attached to the motor.

Furthermore, since the condition of the load was detected with the number of the electrical connections between the internal and external of the motor kept minimum, the current detectors, installed outside the motor, were located far from the optimal positions for detection so that there arose a problem of degradation of accuracy in current detection and a problem of increased cost due to the necessity of circuits for insulating the current detectors from the motor.

An object of this invention is to provide a synchronous motor which can operate with low acoustic noise and over a wide range of rotational speeds, and a method for controlling such a synchronous motor.

Another object of this invention is to provide a synchronous motor according to which plural data can be transmitted and received by means of circuits of inexpensive configuration without increasing the number of insulating circuits, and the condition of the load attached to the motor can be ascertained from outside the motor housing, and a method for controlling such a synchronous motor.

In order to attain the objects mentioned above, this invention is characterized by the configurations described below.

This invention is featured by a synchronous motor incorporating therein a three-phase inverter which generates three-phase AC voltages whose amplitudes and frequency can be varied and position sensors for detecting the positions of the magnetic poles of the synchronous motor, comprising an input current detecting unit for detecting an input current or its equivalent and converting it to the corresponding digital quantity; a motor speed calculation unit for digitally calculating the rotational speed of the synchronous motor; a digital communication reception unit for receiving through communication a digital speed command value, a digital input current command value, or a digital input power command value from outside the synchronous motor; a digital feedback control unit for adjusting the amplitudes and frequency of the AC voltages outputted from the three-phase inverter in such a manner that the rotational speed of the motor, the input current or the input power approximates the speed command value, the input current command value or the input power command value, respectively; and a digital communication transmission unit for transmitting through communication the rotational speed of the motor, the input current and the input power to outside the synchronous motor.

As to a synchronous motor provided with an inverter, input current directly means DC current inputted to the DC side of the inverter, but the equivalent quantities can be detected through various detecting/calculating procedures such as, for example, by calculating the values equivalent to the respective phase currents flowing through the three-phase windings of the synchronous motor. These quantities are hereafter referred to collectively as "input currents" or "input current equivalents".

This invention is also featured by a microcomputer incorporated in the synchronous motor and capable of executing those digital calculation procedures.

According to one preferable embodiment of this invention, there is provided a synchronous motor incorporating therein a three-phase inverter which generates three-phase AC voltages whose amplitudes and frequency can be varied to drive the synchronous motor and position sensors for detecting the positions of the magnetic poles of the synchronous motor, comprising an input current detection circuit for detecting in analog way the input current flowing into the DC terminal of the three-phase inverter; an input current calculation unit for calculating a digital input current value from the input current; a motor speed calculation unit for digitally calculating the rotational speed of the synchronous motor on the basis of the outputs of the position sensors; a communication reception unit for receiving a speed command value from outside the housing of the synchronous motor; a speed control unit for adjusting the amplitudes and frequency of the AC voltages outputted by the three-phase inverter in such a manner that the rotational speed of the synchronous motor approaches the speed command value; and a communication transmission unit for transmitting the input current values and the motor speed to outside the housing of the synchronous motor.

According to another preferable embodiment of this invention, an inexpensive synchronous motor can be realized which can be operated with low acoustic noise, whose load condition and speed can be accurately detected from outside the motor housing, and in which plural pieces of information can be transmitted and received without increasing the number of insulating circuits for insulating the internal of the motor from the external thereof.

Other objects and features of this invention will be apparent when one reads the following description of the embodiments.

BRIEF DESCRIPTION OF THE DRAWINGS

FIG. 4 is the flow char of a PWM interruption procedure performed in the first embodiment of this invention;

FIG. 5 is the flow chart of an interruption procedure for position detection, performed in the first embodiment of this invention;

DESCRIPTION OF THE EMBODIMENTS

Embodiments of this invention will now be described below in detail in reference to the attached drawings.

[Embodiment 1]

Figure 1:
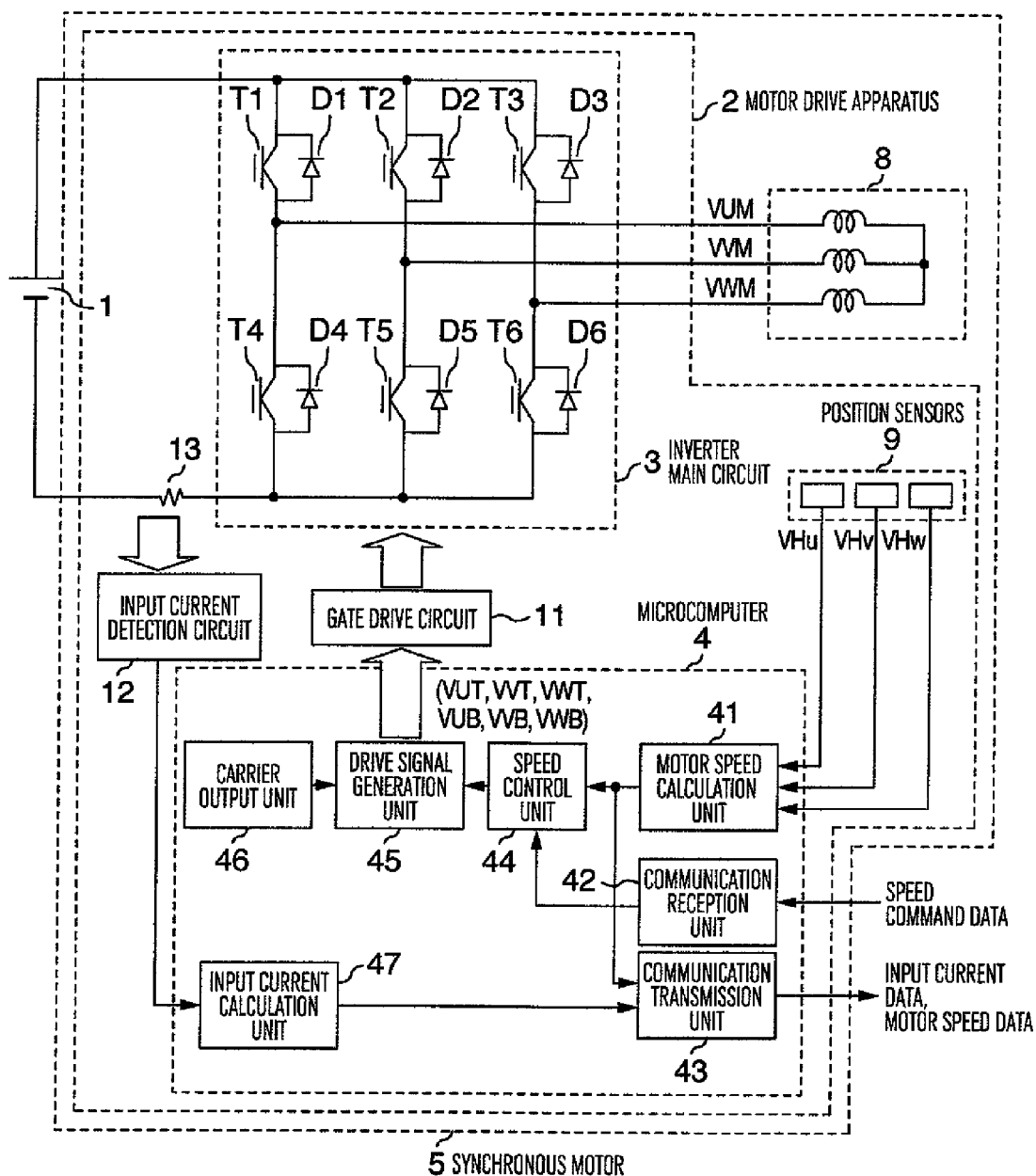
FIG. 1 shows in block diagram the overall circuit configuration of a synchronous motor as a first embodiment of this invention.

FIG. 1 shows in block diagram the overall circuit configuration of a synchronous motor as a first embodiment of this invention. The motor drive apparatus 2 shown with the first embodiment of this invention in FIG. 1 is very suitable for use as a drive means for the fan motor of the indoor or outdoor unit of an air conditioner, or for a hot water supplier.

<Description of Overall Configuration>

As shown in FIG. 1, a DC power source 1 supplies power to a motor drive circuit 2 for a synchronous motor. The supplied power has a high voltage of, for example, about 141~450 volts that is available from a battery or a commercial converter which can rectify and smooth AC power from the commercial power line. An inverter main circuit 3 consists of three pairs of switching elements (T1 and T4, T2 and T5, and T3 and T6) connected between the DC terminals, each pair of switching elements being connected in series with each other, and the connection point between the series connected switching elements providing each terminal for the three-phase voltages. The switching elements T1~T6 are provided respectively with diodes D1~D6 connected in inverse parallel with the switching elements T1~T6. This inverter main circuit 3 generates three-phase voltages having variable amplitudes and frequency on the basis of the power supplied from the DC power source 1 and the gate drive signal from a gate drive circuit 11, and supplies the three-phase voltages to the phase windings 8 of the synchronous motor 5. An input current detection circuit 12 serves to detect the current flowing through a current limiting resistor 13 connected with the DC input terminal of the inverter main circuit 3. The input current detection circuit 12 outputs the analog voltage value corresponding to the detected current, to a microcomputer 4. The current limiting resistor 13 serves also to protect the inverter main circuit 3 from excessive current.

The synchronous motor is provided with position sensors 9, which detect the positions of the magnetic poles of the synchronous motor and generate position sensor signals VHu~VHw, which are supplied to the microcomputer 4.

The summary of the processing by the microcomputer 4 will be described as follows. A communication reception unit 42 receives speed command data Vsp from outside the motor housing through communication, converts the received speed command data to a speed command value, and transfers the speed command value to a speed control unit 44. A motor speed calculation unit 41 digitally calculates the speed of the motor on the basis of the position sensor signals VHu~VHw, and outputs the detected value of the motor speed to the speed control unit 44 and a communication transmission unit 43. The speed control unit 44 outputs to a drive signal generation unit 45 a voltage adjusting value that adjusts the amplitudes and frequency of the AC voltages outputted from the three-phase inverter in such a manner that the difference between the speed command value from the communication reception unit 42 and the detected value of the motor speed from the motor speed calculation unit 41 approaches zero. A drive signal generation unit 45 generates a drive signal by using the voltage adjusting value and the carrier outputted from a carrier output unit 46, and outputs the drive signal to the gate drive circuit 11.

An input current calculation unit 47 converts the detected value of voltage corresponding to the input current detected by the input current detection unit 12, to the corresponding digital quantity, and further converts the digital quantity to an input current value, which is outputted to the communication transmission unit 43. The communication transmission unit 43 transmits the input current value and the detected value of speed as digital data to outside the housing of the synchronous motor. On the basis of the data on the input current and the speed, it is possible to grasp the condition of the load attached to the motor from outside the motor. Accordingly, such a fine control of the motor as the detection of load malfunction or the optimization of rotational speed can be realized. It is noted here that all the functions of the motor speed calculation unit 41, the communication reception unit 42, the communication transmission unit 43, the speed control unit 44, the drive signal generation unit 45, the carrier output unit 46 and the input current calculation unit 47 can be realized by the microcomputer 4 with its dedicated software.

The foregoing is the general description of the synchronous motor as the first embodiment of this invention.

Figure 27:
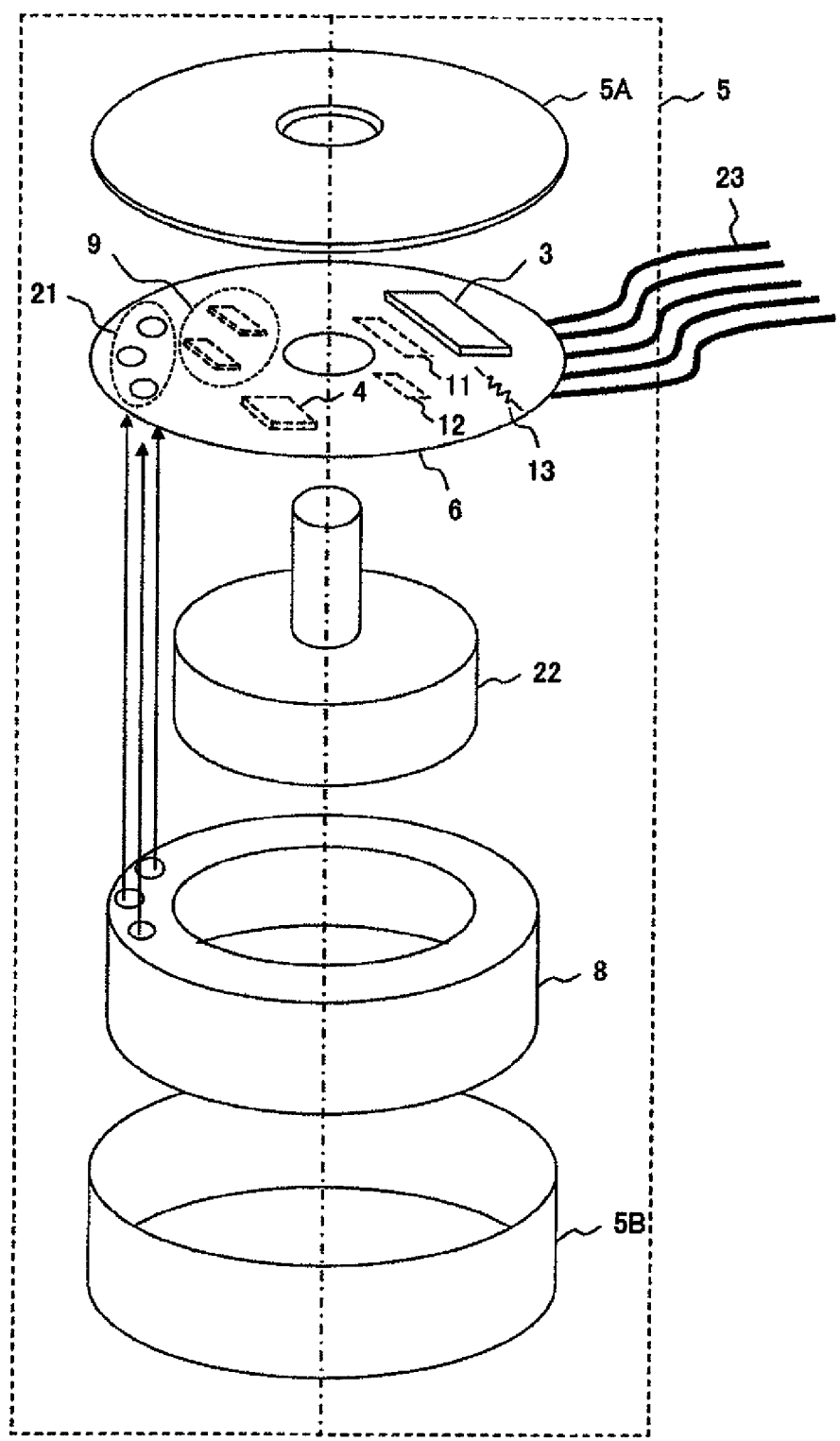
FIG. 27 is a perspective, exploded view of the synchronous motor shown as the first embodiment of this invention in FIG. 1.

FIG. 27 is a perspective, exploded view of the synchronous motor shown as the first embodiment of this invention in FIG. 1. The synchronous motor 5 shown in FIG. 27 has the inverter main circuit 3, the microcomputer 4, the position sensors 9, the gate drive circuit 11, an input current detection circuit 12 and the current limiting resistor 13, mounted on a substrate 6 installed inside the motor housing. The synchronous motor 5 according to this embodiment has its windings 8 inserted in the lower part 5B of the motor housing. A permanent magnet rotor 22 is disposed inside the windings 8 with a narrow air gap between the rotor 22 and the windings 8. The substrate 6 installed inside the motor housing is disposed above the permanent magnet rotor 22. The position sensors 9 are mounted on that surface (lower surface in FIG. 27) of the substrate 6 which faces the permanent magnet rotor 22, so as to facilitate the detection of the positions of the magnetic poles on the permanent magnet rotor 22. For example, the microcomputer 4, the input current detection circuit 12 and the current limiting resistor 13 are mounted on that surface (lower surface in FIG. 27) of the substrate 6 which faces the permanent magnet rotor 22, whereas the inverter main circuit 3 is mounted on the opposite surface (upper surface in FIG. 27) of the substrate 6. Terminals for being connected with the motor windings 8 are provided on the substrate 6, and the ends of the windings 8 are soldered to the terminals 21. Five lead wires 23 from the external circuit are also soldered to the substrate 6. The five lead wires 23 consist of a lead wire for a DC voltage, a lead wire for a control power source of about 15 V, a lead wire for a DUTY command, a lead wire for a rotational speed pulse signal and a lead wire for the ground potential. The upper part 5A of the housing of the motor 5 is disposed like a lid above the substrate 6. Accordingly, when the motor 5 is assembled, the substrate 6 is contained inside the motor housing consisting of the upper part 5A and the lower part 5B.

Figure 28:
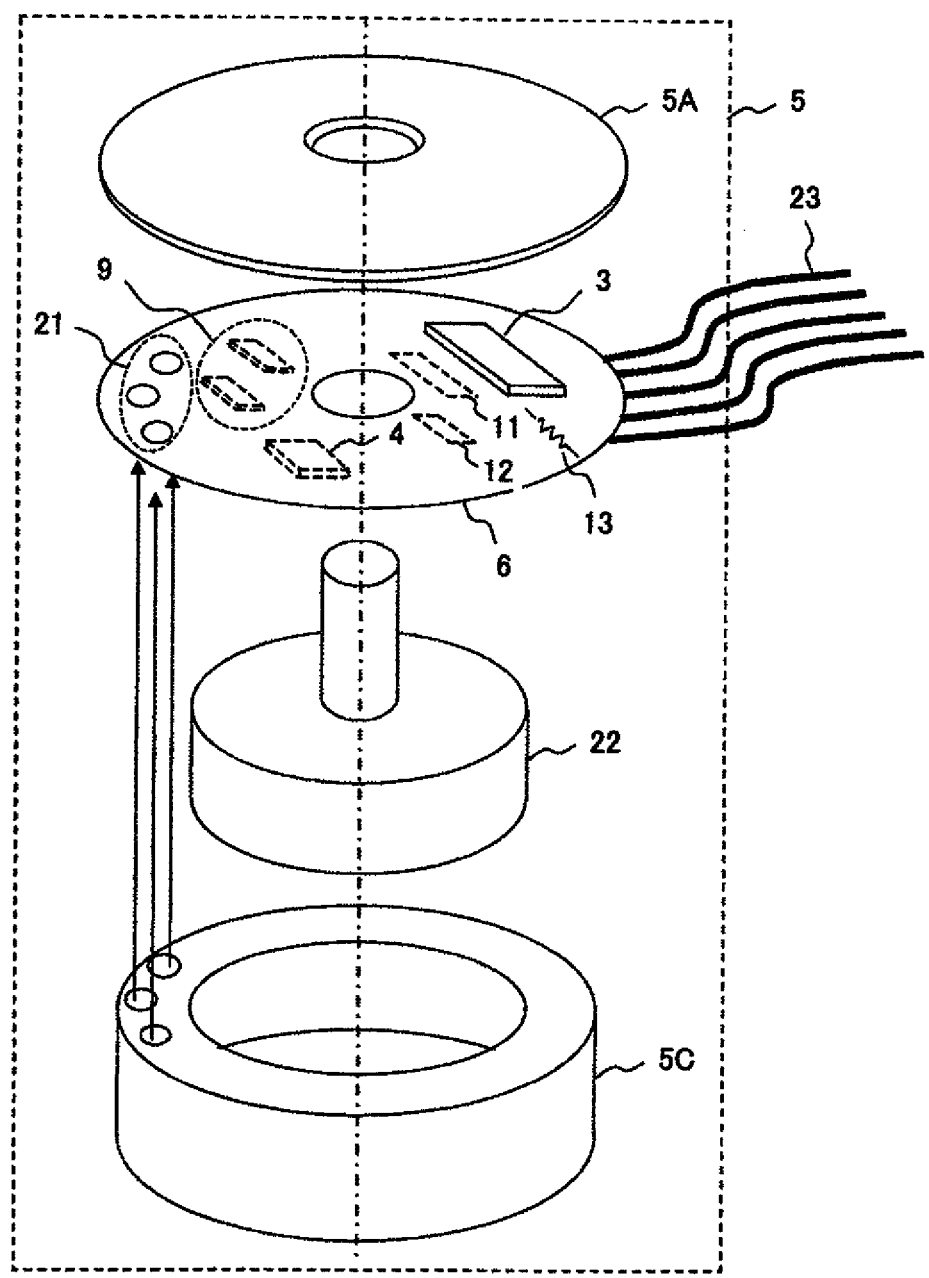
FIG. 28 is a perspective, exploded view of a variation of the synchronous motor shown as the first embodiment of this invention in FIG. 1.

The synchronous motor 5 may dispense with the lower part 5B of the motor housing. In such a case, the windings 8 may be molded with, for example, suitable resin. This sort of variation is shown in FIG. 28. Such molded windings are indicated at 5C in FIG. 28. The other constituents in FIG. 28 are the same as those indicated at the same reference symbols in FIG. 27.

Figure 29:
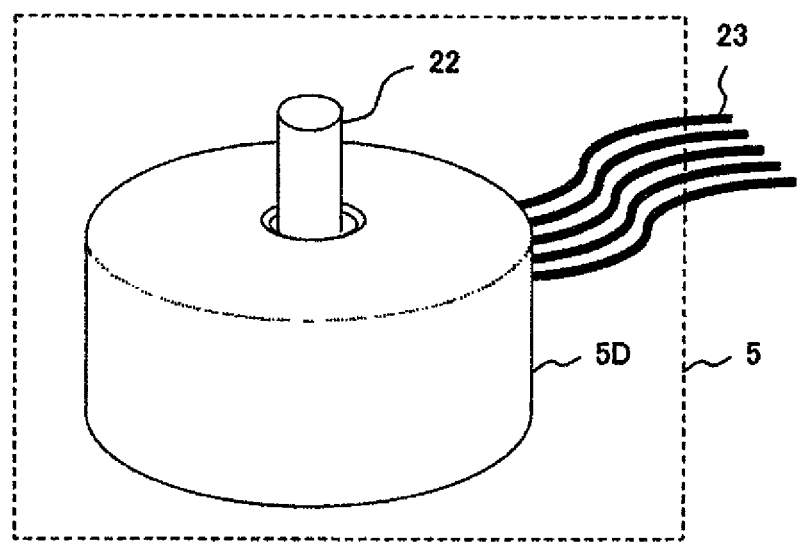
FIG. 29 is a perspective, exploded view of another variation of the synchronous motor shown as the first embodiment of this invention in FIG. 1.

The synchronous motor 5 may dispense with both the upper part 5A and the lower part 5B, of the motor housing. In such a case, the windings 8 and the substrate 6 may be molded together with resin or the like. Such a variation is shown in FIG. 29. Different from FIGS. 27 and 28, FIG. 29 shows the synchronous motor in its completely assembled status. The molded part 5D contains the windings 8 and the substrate 6, and the substrate 6 has the inverter main circuit 3, the microcomputer 4, the position sensors 9, the gate drive circuit 11, an input current detection circuit 12 and the current limiting resistor 13, mounted thereon.

Figure 2:
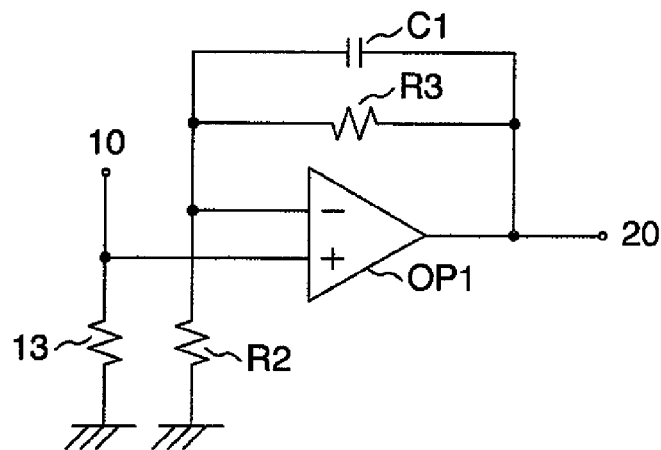
FIG. 2 is a circuit diagram of an input current detection circuit used in the first embodiment of this invention.

FIG. 2 is a circuit diagram of an input current detection circuit 12 used in the first embodiment of this invention. This input current detection circuit 12 is installed inside the housing of the synchronous motor and comprises an input terminal 10, an output terminal 20, the current limiting resistor 13, an operational amplifier OP1, a resistor R2, a resistor R3 and a capacitor C1.

The input terminal 10 is connected with the ground potential (i.e. grounded) via the current limiting resistor 13 and also with the DC input terminal of the inverter main circuit 3. Accordingly, the motor current, having flown through the windings 8 of the synchronous motor, returns through the current limiting resistor 13 to the DC power source 1. One end of the current limiting resistor 13 is connected with the ground whereas the other end of the current limiting resistor 13 is connected with the non-inverting input terminal of the operational amplifier OP1. The inverting input terminal of the operational amplifier OP1 is grounded via the resistor R2, and a parallel circuit of the resistor R3 and the capacitor C1 is connected between the output terminal and the inverting input terminal, of the operational amplifier OP1. The output terminal of the operational amplifier OP1 leads to the output terminal 20, which is basically connected with the microcomputer 4. The resistor 13, the operational amplifier OP1, the resistors R2 and R3, and the capacitor C1 constitute a current-to-voltage converting circuit that converts the magnitude of the current flowing through the current limiting resistor 13 to the corresponding voltage. If the precision of current is not required, the voltage corresponding to the magnitude of the current flowing through the current limiting resistor 13 may be directly supplied to the microcomputer 4. Further, if the voltage at the output terminal 20 fluctuates due to the fluctuation of the DC voltage or the influence by switching surge, the voltage may first be filtered through a filtering circuit composed of resistors and capacitors and then supplied to the microcomputer.

<Description of Flow of Process by Software>

Now, those controls and processes which are necessary for the explanation of the embodiments of this invention will be described below by way of flow charts.

Figure 3:
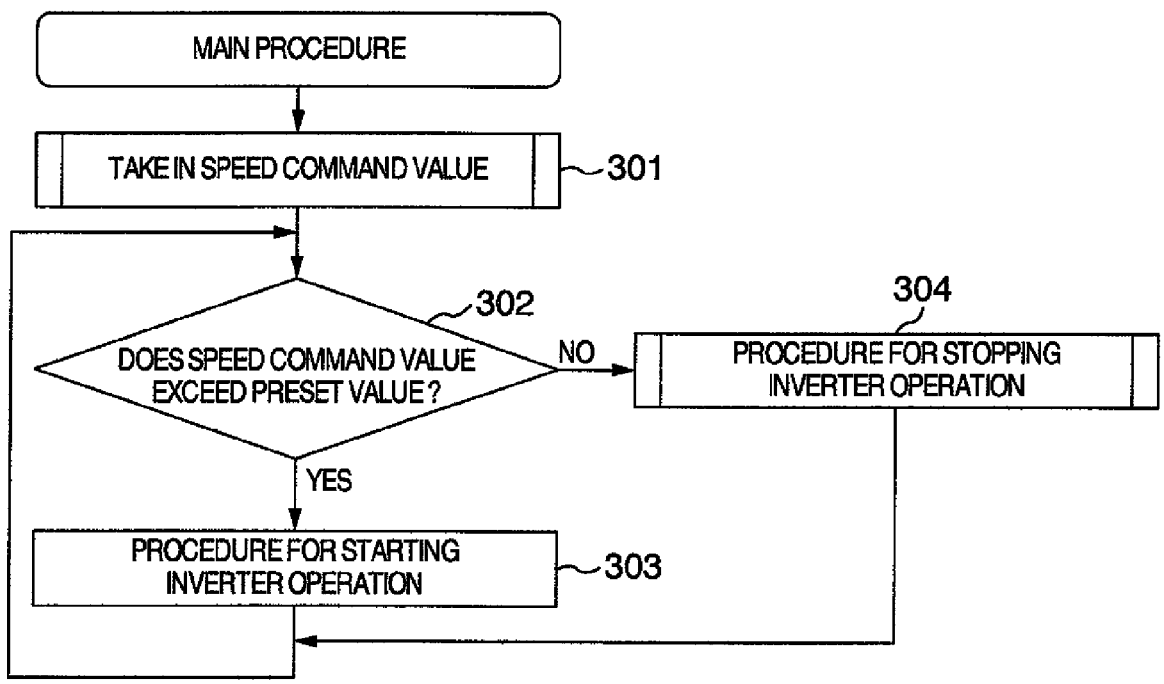
FIG. 3 is the flow chart of a main process performed in the first embodiment of this invention.

FIG. 3 is the flow chart of a main process performed in the first embodiment of this invention. Further, FIGS. 4, 5, 9, 13 and 14 show in flow chart a PWM interruption procedure, a position detection interruption procedure, a control period interruption procedure, a communication reception interruption procedure and a communication transmission interruption procedure, respectively.

Interruption processes other than the main process occur when each interruption event occurs. For example, the PWM interruption procedure takes place at the middle of the PWM period; the position detection interruption procedure in synchronism with the edge of a position sensor signal; the control period interruption procedure at the time of overflow of the control period timer; the communication reception interruption procedure at the time of reception of data from outside the motor housing; and the communication transmission interruption at the time of transmission of data to outside the motor housing. These interruption events are only exemplary and other interruption events may be defined in accordance with the motor characteristics, the characteristics of the load attached to the motor, and the motor speeds. In this embodiment, five interruptions are described, but more or less than five interruptions may be introduced.

<Main Process>

The main process shown in FIG. 3 will be described below.

The main process is started with Step 301 wherein the speed command value is read in by the communication reception unit 42 and processed by the software for executing the function of the unit 42. Then, the start or stop of inverter operation is decided on in Step 302, and when the speed command value is equal to or greater than a preset value, the step of driving the inverter is executed in Step 303. When the speed command value is smaller than the presser value, the step of stopping the inverter is executed in Step 304. In the main process, the above mentioned steps are repeated in an infinite loop. When the speed command value is equal to or greater than the preset value after the speed command value has been read in, the motor rotational speed at this time is stored in an area of the RAM and the flow shifts to the step of driving the inverter. More detailed description is omitted.

<PWM Interruption Procedure>

FIG. 4 is the flow char of a PWM interruption procedure performed in the first embodiment of this invention.

The PWM interruption procedure consists of Step 401 of renewing phase data, Step 402 of calculating voltage commands for respective phases, and Step 403 of delivering PWM output. The flow of the procedure shown in FIG. 4 is executed by the software for executing the function of the drive signal generation unit 45.

The phases of the voltages applied to the motor are renewed in Step 401, and the respective phase voltage commands Vu, Vv and Vw having phase differences of 120 degrees with respect to one another are delivered in Step 402 in accordance with the voltage amplitude data depending on the voltage adjusting value calculated by the speed control unit 44 and the above mentioned voltage phase data. In Step 403, the respective phase voltage commands Vu, Vv and Vw are compared with the carrier and the inverter drive signals are generated. This procedure is not the main process in this invention and also well-known, and therefore the detailed description thereof is omitted.

<Position Detection Procedure>

FIG. 5 is the flow chart of an interruption procedure for position detection, performed in the first embodiment of this invention.

This procedure is started up as an interruption procedure whenever the edges of the position sensor signals are detected. It consists of Step 501 of reading in the position signal data, Step 502 of setting the position status, Step 503 of loading and clearing the phase difference counter, Step 504 of calculating the interval time, Step 505 of calculating the motor speed, and Step 506 of loading the detected value of motor speed. This procedure is executed mainly by the software for executing the function of the motor speed calculation unit 41.

Figures 6, 7:
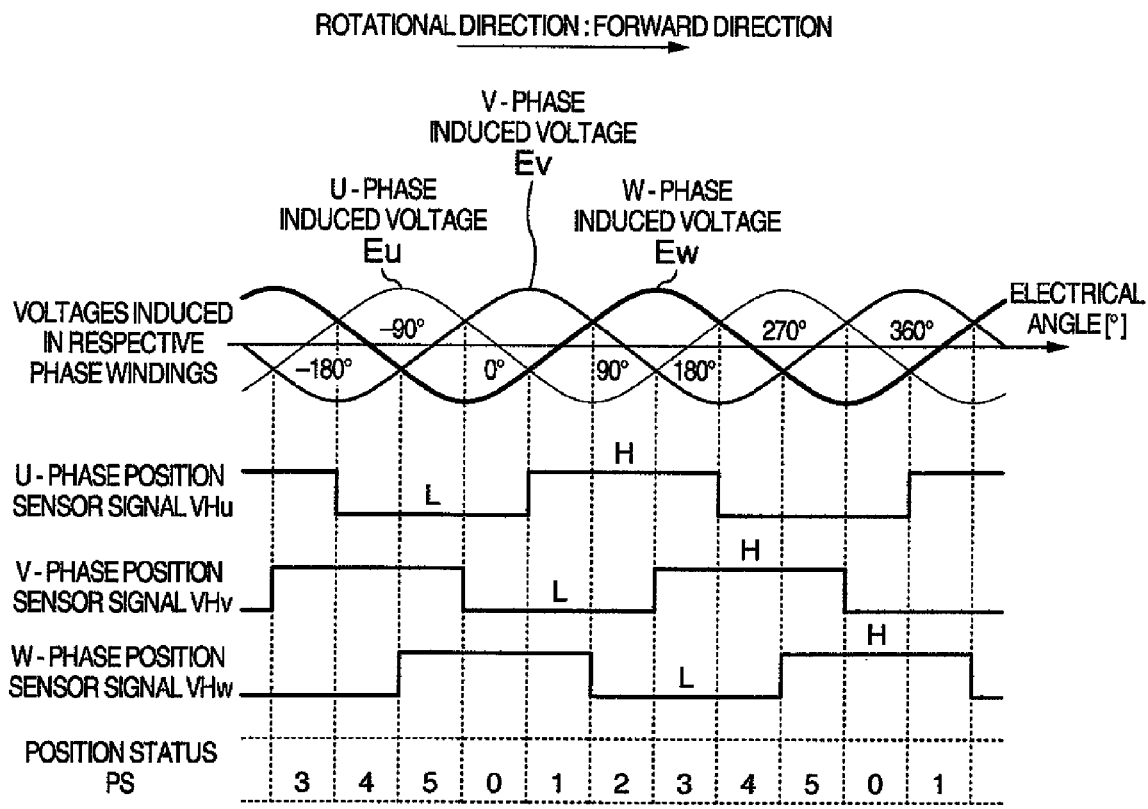
FIG. 6 graphically shows the interrelationship among the three-phase induced voltages, the corresponding position sensor signals and the related position status, associated with the first embodiment of this invention.
FIG. 7 illustrates the storage areas of a polarity counter and a phase difference counter, used in the first embodiment of this invention.

In Step 501, the status "H" or "L" of a position sensor signal for each phase is read in. Then, in Step 502, the position status PS as shown in FIG. 6 is set on the basis of the position sensor signal data. In Step 503, the phase difference counter is loaded as shown in FIG. 7 in accordance with the position status PS, and the phase difference counter, after having been loaded, is cleared to zero.

FIG. 7 illustrates the storage areas of a phase difference counter, used in the first embodiment of this invention. As shown in FIG. 7, the phase difference counter has six storage areas (covering 360 electrical degrees). These storage areas are prepared for three position sensors, and the number of storage areas may be changed according to the number of position sensors to be used.

As shown retrospectively in FIG. 5, in Step 504 where interval times are calculated, the time points for detecting the positions of the magnetic poles are read in and calculated. In this interruption procedure, since the interruption takes place at the edges of the position sensor signals in the form of input capture interruption, the time points at which interruption takes place at the edges of the position sensor signals are automatically secured. In this procedure, the time points are read in from the register and stored in the dedicated areas in the RAM. Although this embodiment is described as an example in which interruption takes place in synchronism with of the edges of the position sensor signal, interruption may take place repeatedly at any moment within the period of the position sensor signal. Also, it is possible, for example, that the change of the position sensor signal is monitored at an interval equal to the PWM interruption period and interruption is initiated the instant that the signal changes.

The interval time for position detection is calculated from the read time of position detection and the previous time of position detection, and the calculated value is stored in the dedicated area in the RAM.

Figure 8:
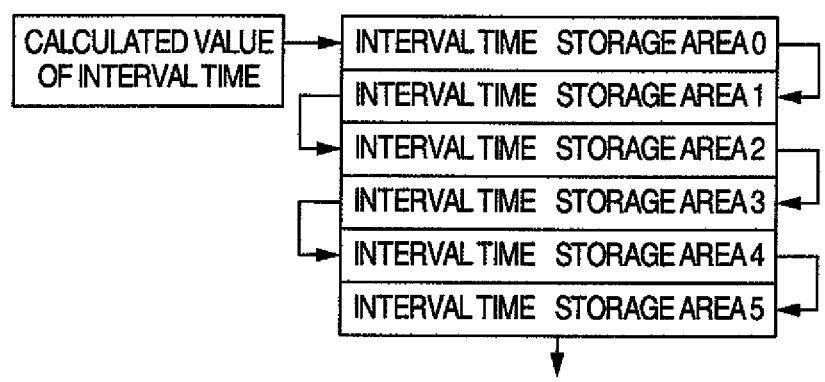
FIG. 8 illustrates the storage areas in which interval times are stored, used in the first embodiment of this invention.

FIG. 8 illustrates the storage areas in which interval times are stored, used in the first embodiment of this invention. As shown in FIG. 8, there are six storage areas for interval times (covering 360 electrical degrees), and the interval time corresponding to the first 60 electrical degrees is stored in the uppermost storage area. In other words, the interval times over one period of electrical angles can be obtained and they are eliminated in one period of time.

In Step 505, the six interval times are averaged and the averaged quantity is then converted to the corresponding speed. If rotational speed is low or load fluctuation is large, the detected value of speed may be calculated from even number of interval times. According to any of the above described procedures, the unevenness in the position signals can be suppressed and the calculation of the detected value of speed can be stably performed.

In Step 506, the rotational speed of the motor calculated in Step 505 is stored as the detected value of speed in an area in the RAM.

<Control Period Interruption Procedure>

Figure 9:
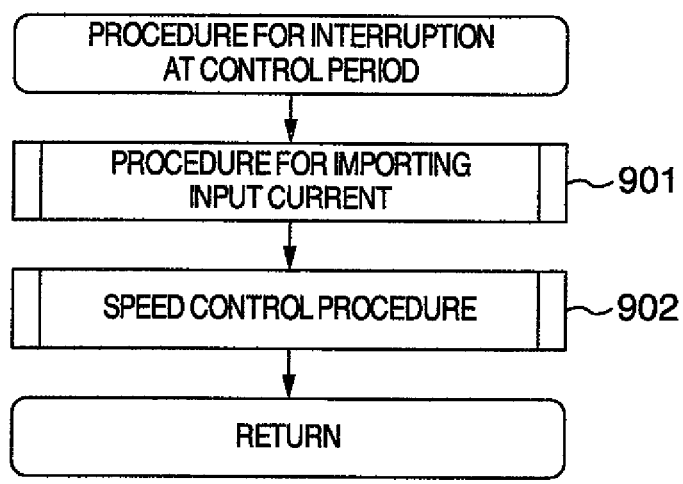
FIG. 9 is the flow chart of a control period interruption procedure performed in the first embodiment of this invention.

FIG. 9 is the flow chart of a control period interruption procedure performed in the first embodiment of this invention.

This procedure is started up as an interruption procedure initiated at the time when the control period timer overflows, or simultaneously with the position detection interruption procedure. This procedure consists of Step 901 of importing input current and Step 902 of performing speed control, and is executed by the software for executing the functions of the input current calculation unit 47 and the speed control unit 44.

Figure 10:
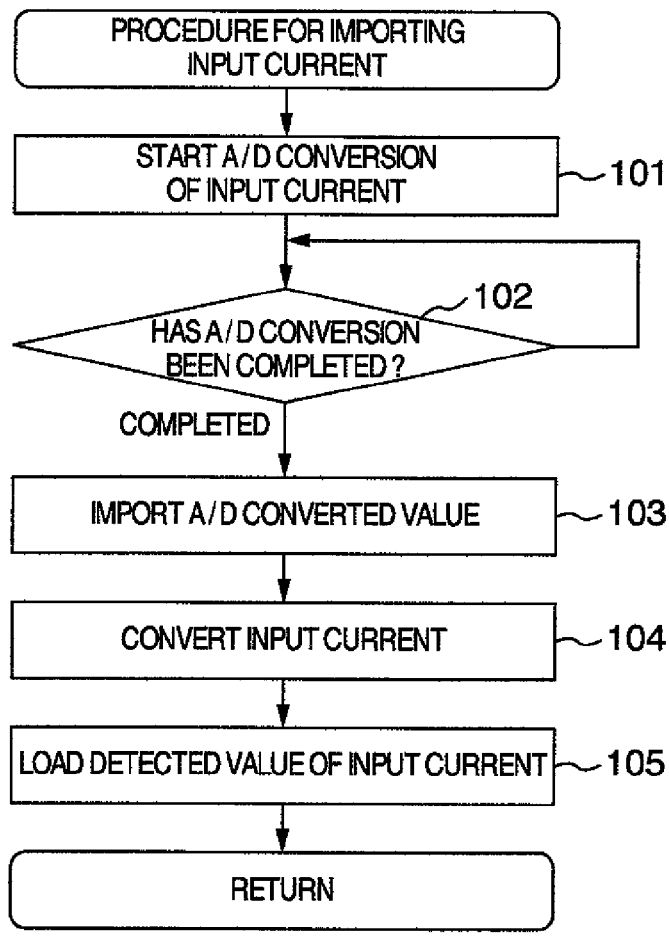
FIG. 10 is the flow chart of an input current import procedure performed in the first embodiment of this invention.

FIG. 10 is the flow chart of an input current import procedure performed in the first embodiment of this invention.

Figure 11:
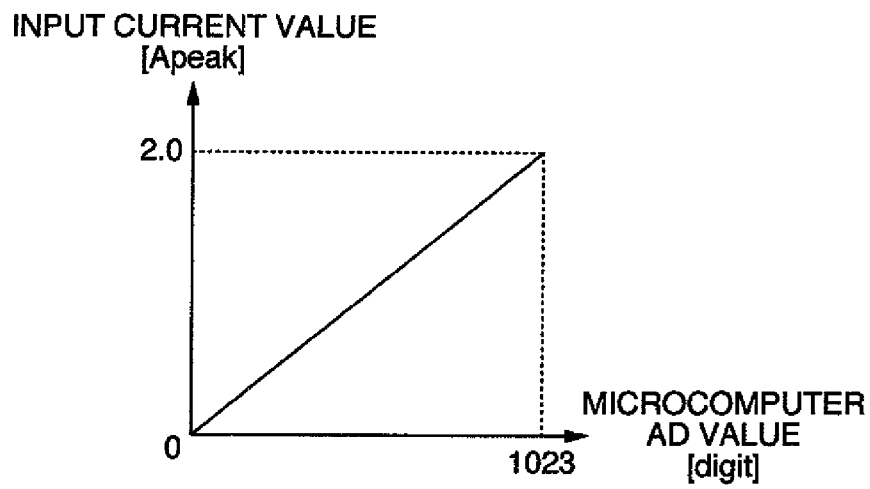
FIG. 11 graphically shows the relationship between the input current value and the microcomputer AD value, associated with the first embodiment of this invention.

In this procedure, in order to perform the A/D conversion in the microcomputer in Step 101, of the voltage value in accordance with the input current inputted to the microcomputer 4 from the input current detection unit 12, the A/D conversion function at the input current A/D conversion port of the microcomputer 4 is started up. In Step 102, decision is made on whether the A/D conversion has been completed, and if the conversion has been completed, Step 103 is reached. If the A/D conversion has not been completed, the procedure flow returns to Step 102. In Step 103, the input A/D value, which has been converted to a digital value, is imported. In Step 104, the converted digital value is converted to the detected value of input current corresponding to the microcomputer AD value in accordance with the diagram shown in FIG. 11. In Step 105, the detected value of input current is stored in an area in the RAM. According to this procedure, the input current value necessary for driving the motor can be obtained so that the operating condition of the load attached to the motor can be grasped. For example, under the condition that the rotational speed of the motor is kept at a certain value, if the input current is large, it proves that the torque associated with the load attached to the motor is large for some cause as compared with the normal operating condition. This situation may correspond to a case for an air conditioner outdoor unit where the fan motor is operating against the wind or where the blades of the fan are in contact with some obstacle. It is therefore possible to detect the operating condition of the load by observing the behavior of input currents. Further, in case of an air conditioner indoor unit or a hot water supplier, it is possible to detect the change in the operating condition of the load such as dirt accumulation on the fan blades or change in the flow channel resistance, by observing the behavior of input currents.

Figure 12:
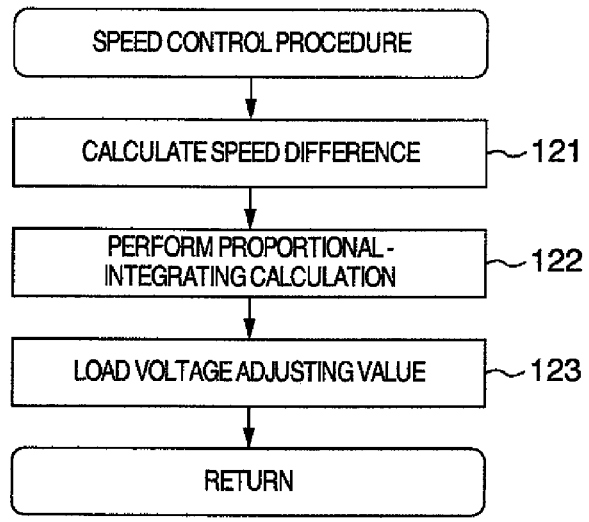
FIG. 12 is the flow chart of a speed control procedure performed in the first embodiment of this invention.

FIG. 12 is the flow chart of a speed control procedure performed in the first embodiment of this invention.

In this speed control procedure, the difference between the speed command value and the detected value of speed is calculated, in Step 121, by using the speed command value received by the communication reception procedure and the detected value of speed calculated by the position detection procedure. In Step 122, the calculated difference is subjected as an input to a proportional-integration calculation, and a voltage adjusting value is calculated such that the difference approaches zero. In Step 123, the voltage adjusting value calculated in Step 122 is loaded.

<Communication Reception Interruption Procedure>

Figure 13:
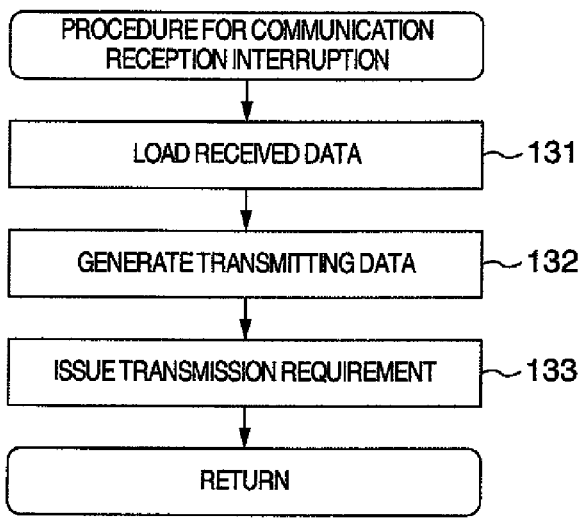
FIG. 13 is the flow chart of a communication reception interruption procedure performed in the first embodiment of this invention.

FIG. 13 is the flow chart of a communication reception interruption procedure performed in the first embodiment of this invention.

This procedure is started up as an interruption procedure when the microcomputer receives data from outside the motor housing. In Step 131, the received data are loaded. In this embodiment, the received data are speed command data. The received speed command value is loaded in an area in the RAM. In Step 132, communication transmitting data are generated. In this embodiment, the data transmitted to outside the motor housing are data on detected speed and input current. The input current data use the data loaded in Step 104 in FIG. 10 and the data of detected speed use the data loaded in Step 506 in FIG. 5. Thereafter, in Step 133, communication transmission requirement is issued, and the status of the microcomputer is changed from reception to transmission.

<Communication Transmission Interruption Procedure>

Figure 14:
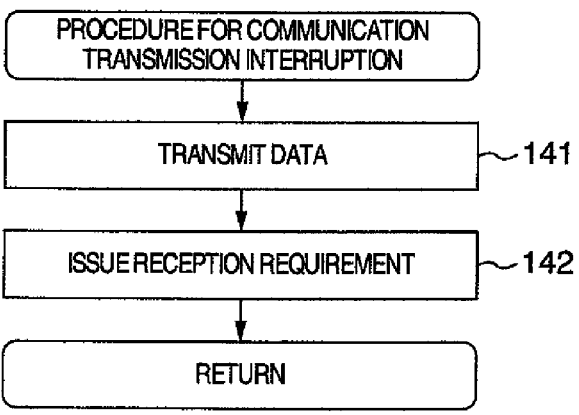
FIG. 14 is the flow chart of a communication transmission interruption procedure performed in the first embodiment of this invention.

FIG. 14 is the flow chart of a communication transmission interruption procedure performed in the first embodiment of this invention.

This procedure is started up as an interruption procedure when data are transmitted to outside the motor housing. In Step 141, the transmission data generated in Step 132 in FIG. 13 are transmitted to outside the motor housing. After a desired number of data have been transmitted, communication reception requirement is issued in Step 142, and then the status of the microcomputer is changed from transmission to reception.

As described hitherto, according to the first embodiment of this invention, the input current value is calculated inside the motor housing, and the calculated input current value and the motor speed data are transmitted through communication from inside the motor housing to outside the motor housing. Further, by receiving the speed command through communication from outside the motor housing to inside the motor housing, it is possible to accurately detect the motor speed and the speed command outside and inside the motor housing. Moreover, by performing control such that the speed data approach the accurately detected speed command, it is possible to realize a synchronous motor whose speed fluctuation can be suppressed and which can be operated with low acoustic noise.

In addition, since the first embodiment of this invention has the input current detection circuit 12 installed within the motor housing and also has the input current calculation unit and the communication transmission unit, it becomes possible to detect the condition of the load attached to the motor from outside the motor housing. Furthermore, according to this embodiment, it becomes possible to provide a synchronous motor which can be fabricated at low cost and which can transmit and receive plural data without increasing the number of insulating circuits for securing insulation between the inside and outside of the motor housing.

[Embodiment 2]

Figure 15:
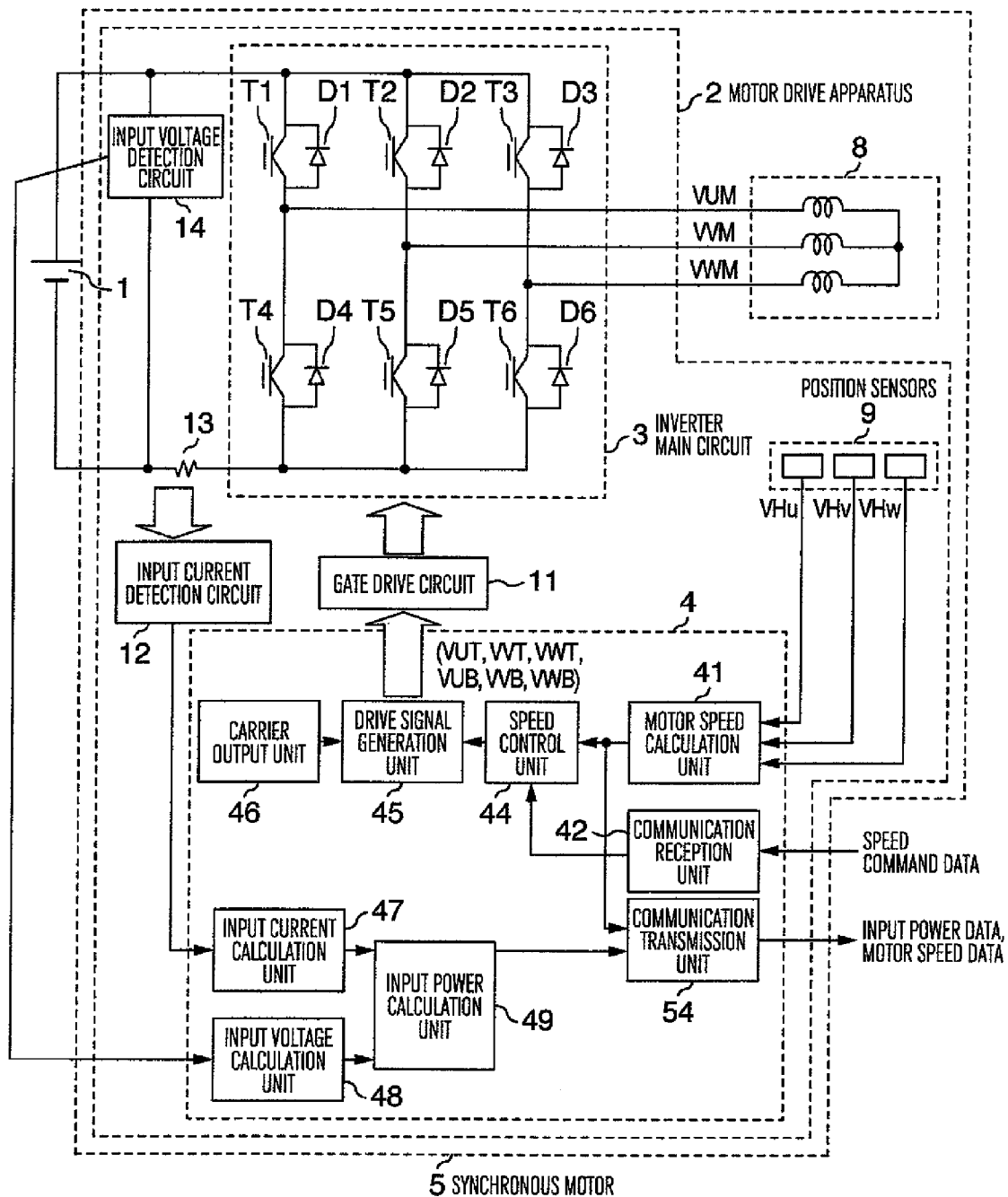
FIG. 15 shows in block diagram the overall circuit configuration of a synchronous motor as a second embodiment of this invention.

FIG. 15 shows in block diagram the overall circuit configuration of a synchronous motor as a second embodiment of this invention. In FIG. 15, constituents similar to those shown in FIG. 1 are indicated at the same reference symbols as in FIG. 1, and the description thereof will be omitted. Only constituents that operate differently will be described in the following.

This second embodiment differs from the first embodiment in that this embodiment additionally includes an input voltage detection circuit 14, an input voltage calculation unit 48, an input power calculation unit 49, and a communication transmission unit 54.

In FIG. 15, the input voltage detection circuit 14 serves to detect the voltage developed between the positive and negative terminals of the DC power source 1, and is realized by, for example, a voltage divider consisting of resistors. The input voltage calculation unit 48 converts the detected value of voltage, that is an analog quantity, representing the input voltage detected by the input voltage detection circuit 14 to the digital quantity representing the input voltage value, and then outputs the digital quantity to the input power calculation unit 49. The input power calculation unit 49 calculates the input power value on the basis of the input voltage value and the input current value, and then outputs the calculated input power value to the communication transmission unit 54. The communication transmission unit 54 outputs the input power data and the motor speed data calculated by the motor speed calculation unit 41, to outside the motor housing.

<Control Period Interruption Procedure>

Figure 16:
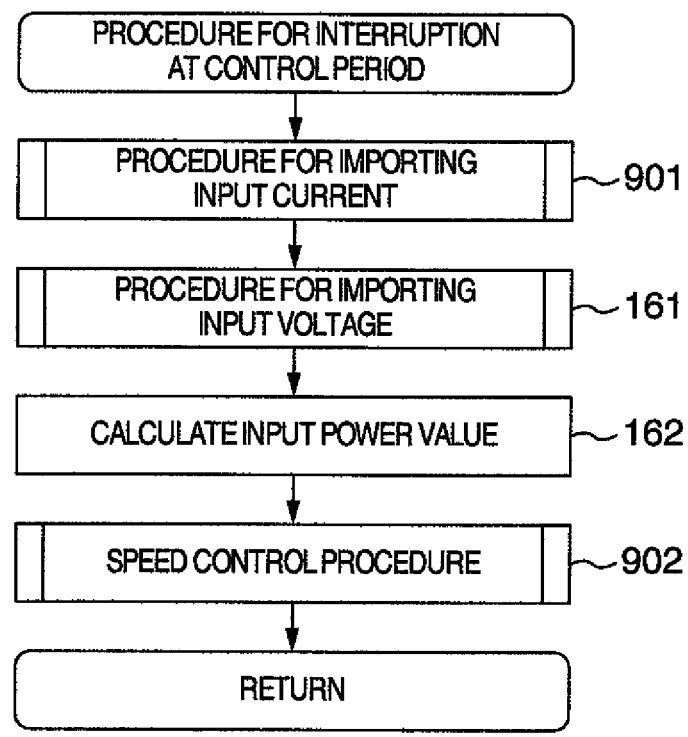
FIG. 16 is the flow chart of a control period interruption procedure performed in the second embodiment of this invention.

FIG. 16 is the flow chart of a control period interruption procedure performed in the second embodiment of this invention.

This procedure is started up as an interruption procedure initiated at the time when the control period timer overflows, or simultaneously with the position detection interruption procedure. This procedure, as shown in FIG. 16, consists of Step 901 of importing input current, Step 161 of importing input voltage, Step 162 of calculating input power and Step 902 of performing speed control, and is executed by the software for executing the functions of the input current calculation unit 47, the input voltage calculation unit 48, the input power calculation unit 49 and the speed control unit 44.

Figure 17:
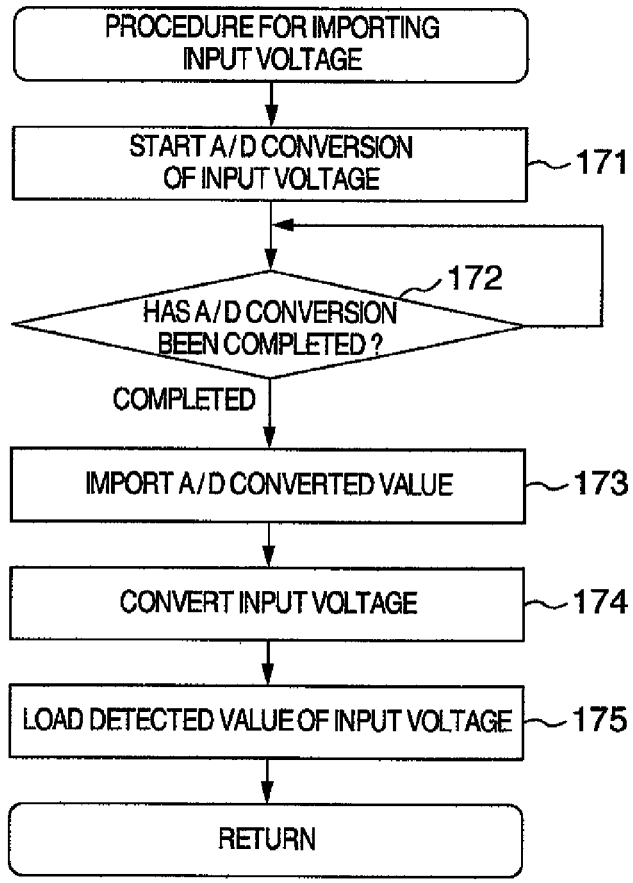
FIG. 17 is the flow chart of an input voltage import procedure performed in the second embodiment of this invention.

FIG. 17 is the flow chart of an input voltage import procedure performed in the second embodiment of this invention.

Figure 18:
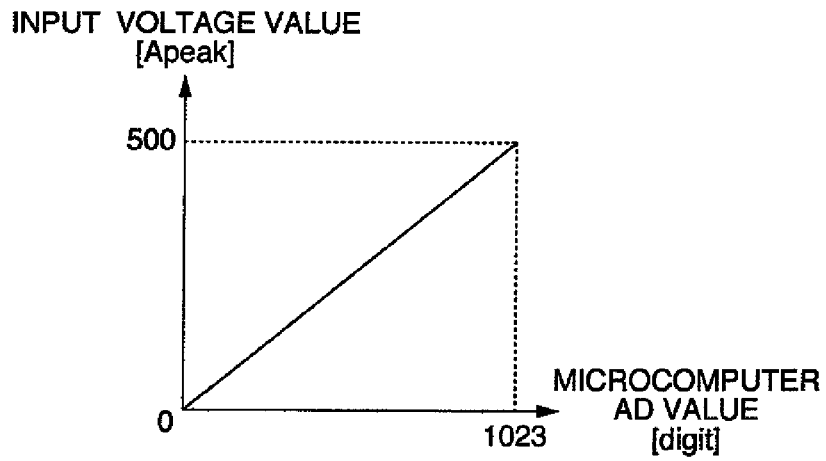
FIG. 18 graphically shows the relationship between the input voltage value and the microcomputer AD value, associated with the second embodiment of this invention.

In this procedure, in order to perform the A/D conversion in the microcomputer of the voltage value corresponding to the input voltage inputted to the microcomputer 4 from the input voltage detection unit 14, the A/D conversion function associated with the input voltage A/D conversion port of the microcomputer 4 is started up in Step 171. In Step 172, decision is made on whether the A/D conversion has been completed, and if the conversion has been completed, Step 173 is reached. If the A/D conversion has not been completed, the procedure flow returns to Step 172. In Step 173, a microcomputer AD value, which has been converted to a digital value, is imported. In Step 174, the converted digital value is converted to the detected value of input voltage corresponding to the microcomputer AD value in accordance with the diagram shown in FIG. 18. In Step 175, the detected value of input voltage is loaded in an area in the RAM.

As shown retrospectively in FIG. 16, on the basis of the input current value and the input voltage value calculated respectively in Steps 901 and 161, the input power value is calculated in Step 162. In Step 162, the input power value necessary for driving the motor can be obtained so that the operating condition of the load attached to the motor can be grasped. For example, under the condition that the rotational speed of the motor is kept at a certain value, if the input power is large, it proves that the torque associated with the load attached to the motor is large for some cause as compared with the normal operating condition. This corresponds to a case of an air conditioner outdoor unit where the fan motor is operating against the wind or where the blades of the fan are in contact with some obstacle. It is therefore possible to detect the operating condition of the load by observing the behavior of input power. Further, in case of an air conditioner indoor unit or a hot water supplier, it is possible to detect the change in the operating condition of the load such as dirt accumulation on the fan blades or change in the flow channel resistance, by observing the behavior of input power value.

The input power value may be calculated directly from the microcomputer AD value for input current and the microcomputer AD value for input voltage, or may be read out, without any calculation, from the map stored in the ROM in the microcomputer so as to alleviate the work load of the microcomputer.

As described above, according to the second embodiment of this invention, the input power value is calculated within the housing of the synchronous motor, the input power value and the motor speed data are transmitted through communication from inside the motor housing to outside the motor housing, and the speed command is received through communication from outside the motor housing to inside the motor housing. Accordingly, it is possible to accurately detect the motor speed and the speed command outside and inside the motor housing. Moreover, by performing control such that the speed data approach the accurately detected speed command, it is possible to realize a synchronous motor whose speed fluctuation can be suppressed and which can be operated with low acoustic noise.

In addition, since this embodiment has the input current detection circuit 12 and the input voltage detection circuit 14 installed within the motor housing and also has the communication transmission unit for communicating with the unit for calculating input current data, the unit for calculating input voltage data and the unit for calculating input power data, it becomes possible to detect the condition of the load attached to the motor from outside the motor housing. Furthermore, according to this embodiment, it becomes possible to provide a synchronous motor which can be fabricated at low cost and which can transmit and receive plural data without increasing the number of insulating circuits for securing insulation between the inside and outside of the motor housing.

Moreover, even in an application where the work load on the motor is constant while the input voltage fluctuates, the input power is calculated inside the motor housing, the calculated power is outputted to outside the motor housing, and the work amount of the load attached to the motor can be grasped outside the motor housing. Accordingly, a synchronous motor can be realized which can be used in the fine control of load.

[Embodiment 3]

Figure 19:
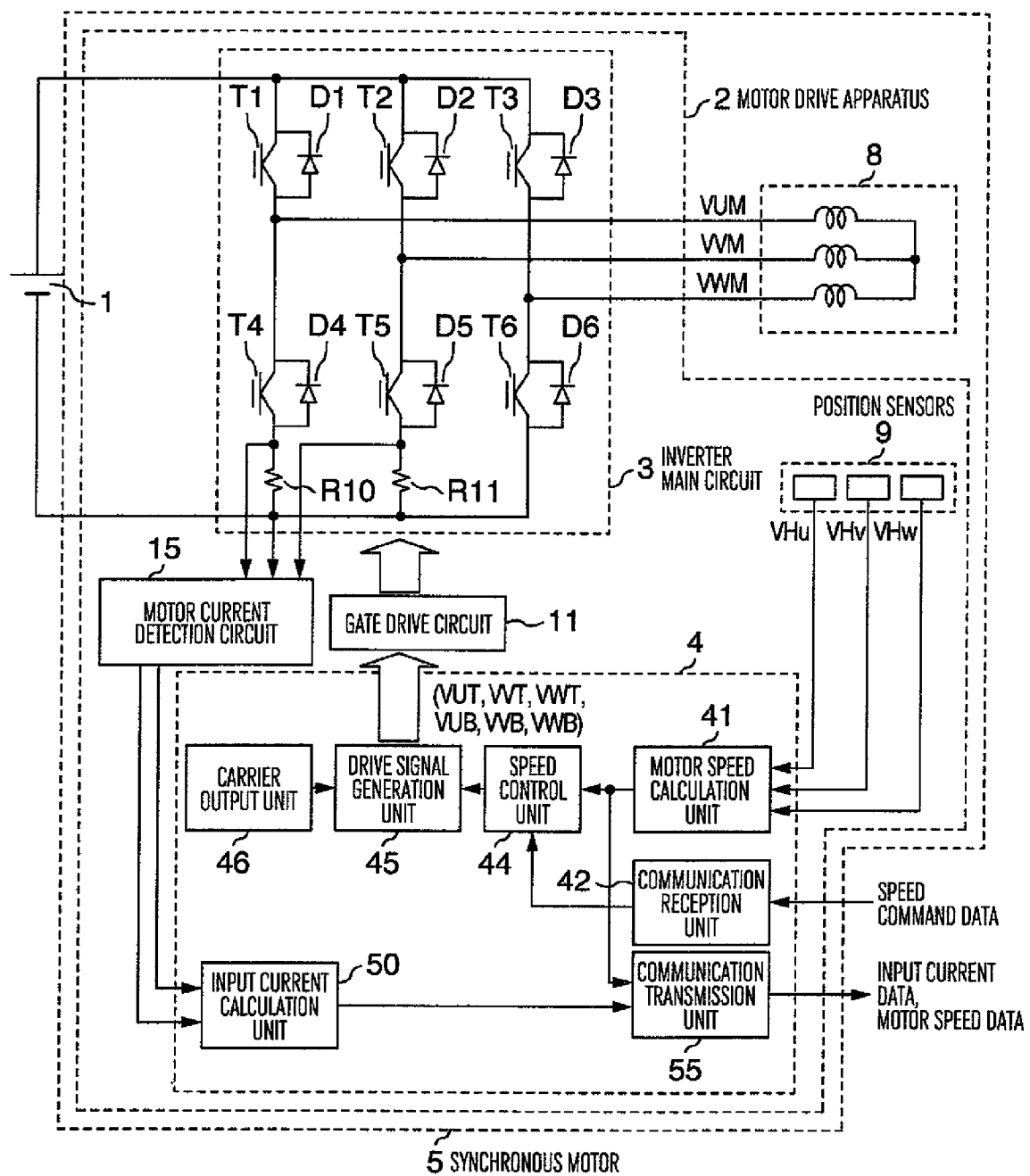
FIG. 19 shows in block diagram the overall circuit configuration of a synchronous motor as a third embodiment of this invention.

FIG. 19 shows in block diagram the overall circuit configuration of a synchronous motor as a third embodiment of this invention. In FIG. 19, constituents similar to those shown in FIG. 1 are indicated at the same reference symbols as in FIG. 1, and the description thereof will be omitted. Only constituents that operate differently will be described in the following.

This embodiment differs from the first embodiment described above in that it includes a motor current detection unit 15, an input current calculating unit 50 and a communication transmission unit 55.

As shown in FIG. 19, the motor current detection unit 15 serves to detect the current flowing through a resistor R10 disposed between the switching element T4 on the negative side of the inverter main circuit 3 and the ground (hereafter referred to as U-phase current), and the current flowing through a resistor R11 disposed between the switching element T5 on the negative side of the inverter main circuit 3 and the ground (hereafter referred to as V-phase current). The motor current detection unit 15 also amplifies the voltages developed respectively across the resistors R10 and R11 and outputs the amplified voltages to the microcomputer 4. The input current calculating unit 50 performs the analog-to-digital (A/D) conversion of the detected values of voltage corresponding to the U- and V-phase currents detected by the motor current detection unit 15, in synchronism with the times of the turn-on of the switching elements T4 and T5, so that the current values for respective phases are obtained. Thereafter, the current values for respective phases are converted to the corresponding input current effective values, which are then fed to the communication transmission unit 55. The communication transmission unit 55 outputs at least one of the input current data and the motor speed data calculated by the motor speed calculation unit 41, to outside the motor housing.

In this embodiment, the effective values of input currents are calculated from the U- and V-phase currents, but the input current data may be calculated from the U- and W-phase currents, the V- and W-phase currents, or the U-, V- and W-phase currents.

As described above, according to the third embodiment of this invention, the motor current value is calculated inside the motor housing, and the input current value and the motor speed data are transmitted through communication from inside the motor housing to outside the motor housing. Further, by receiving the speed command through communication from outside the motor housing to inside the motor housing, it is possible to accurately detect the motor speed and the speed command outside and inside the motor housing. Moreover, by performing control such that the speed data approach the accurately detected speed command, it is possible to realize a synchronous motor whose speed fluctuation can be suppressed and which can be operated with low acoustic noise.

In addition, since the third embodiment of this invention has the motor current detection circuit 15 installed within the motor housing and also has the input current calculation unit and the communication transmission unit, it becomes possible to detect the condition of the load attached to the motor from outside the motor housing. Furthermore, according to this embodiment, it becomes possible to provide a synchronous motor which can be fabricated at low cost and which can transmit and receive plural data without increasing the number of insulating circuits for securing insulation between the inside and outside of the motor housing.

[Embodiment 4]

Figure 20:
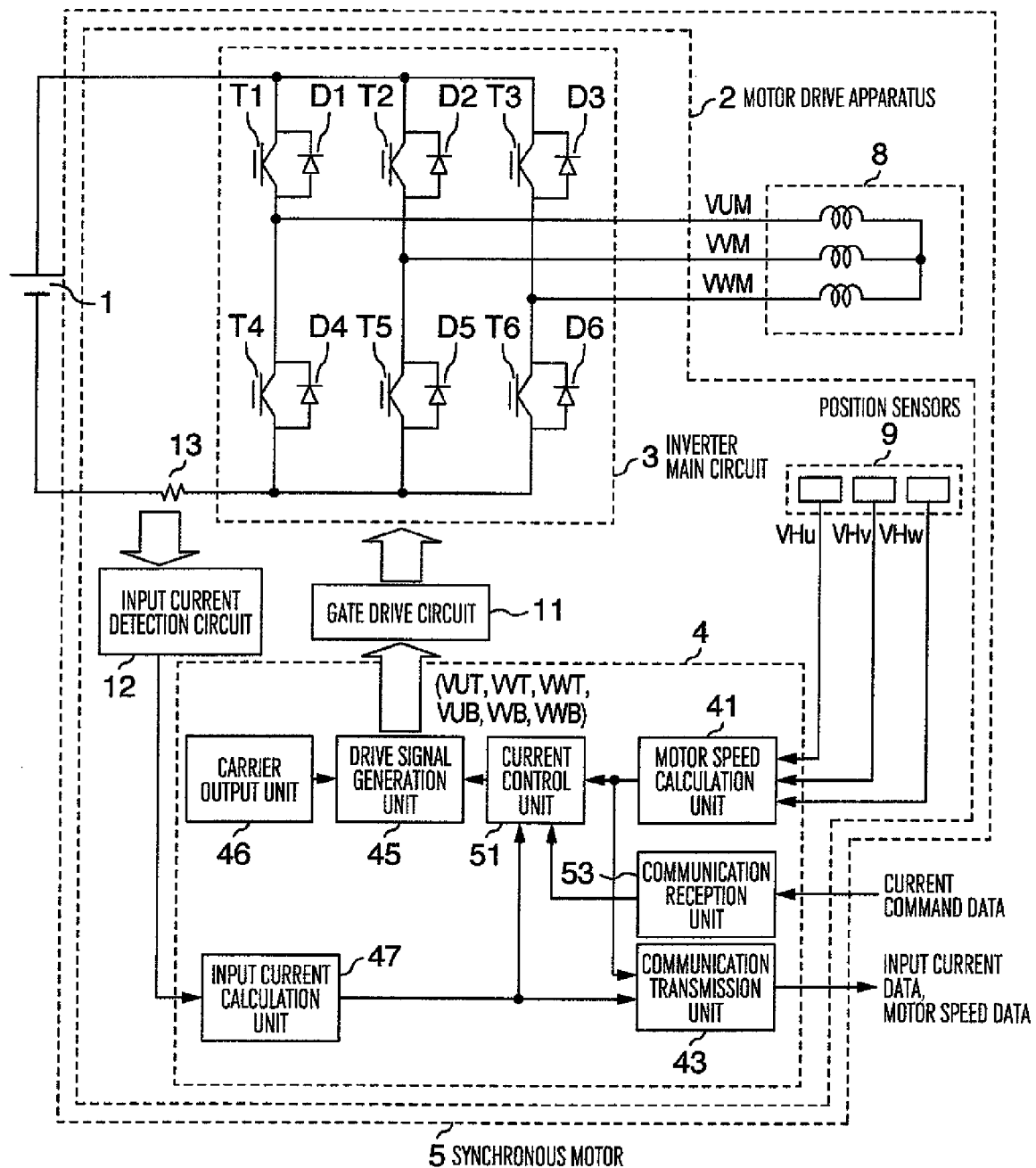
FIG. 20 shows in block diagram the overall circuit configuration of a synchronous motor as a fourth embodiment of this invention.

FIG. 20 shows in block diagram the overall circuit configuration of a synchronous motor as a fourth embodiment of this invention. In FIG. 20, constituents similar to those shown in FIG. 1 are indicated at the same reference symbols as in FIG. 1, and the description thereof will be omitted. Only constituents that operate differently will be described in the following.

This fourth embodiment differs from the first embodiment in that it includes a current control unit 51 and a communication reception unit 53.

As shown in FIG. 20, the current control unit 51 determines the amplitudes of the AC voltages outputted from the three-phase inverter in such a manner that the difference between the input current command value received by the communication reception unit 53 from outside the motor housing and the input current value calculated by the input current calculation unit 47, approaches zero. Also, the current control unit 51 outputs to the drive signal generation unit 45 a voltage adjusting value for adjusting the frequency of the AC voltages generated by the three-phase inverter in accordance with the motor speed obtained by the motor speed calculation unit 41.

<Control Period Interruption Procedure>

Figure 21:
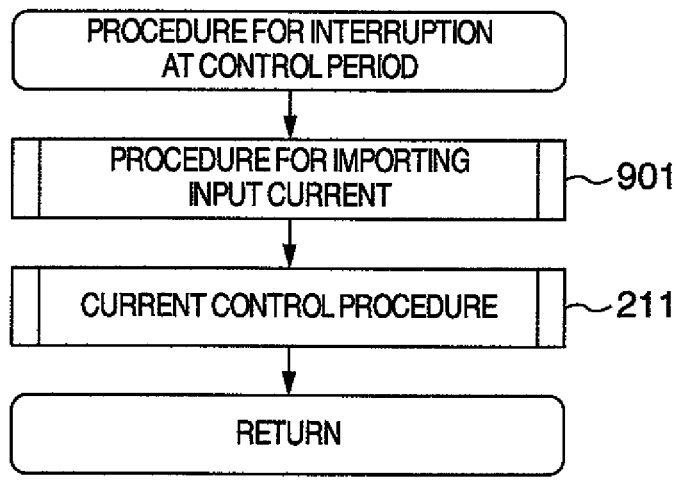
FIG. 21 is the flow chart of a control period interruption procedure performed in the fourth embodiment of this invention.

FIG. 21 is the flow chart of a control period interruption procedure performed in the fourth embodiment of this invention.

This procedure is started up as an interruption procedure initiated at the time when the control period timer overflows, or simultaneously with the position detection interruption procedure. This procedure consists of Step 901 of importing input current, i.e. the same step as described in the first embodiment, and Step 211 of performing current control, and is executed by the software for executing the functions of the input current calculation unit 47 and the current control unit 51.

Figure 22:
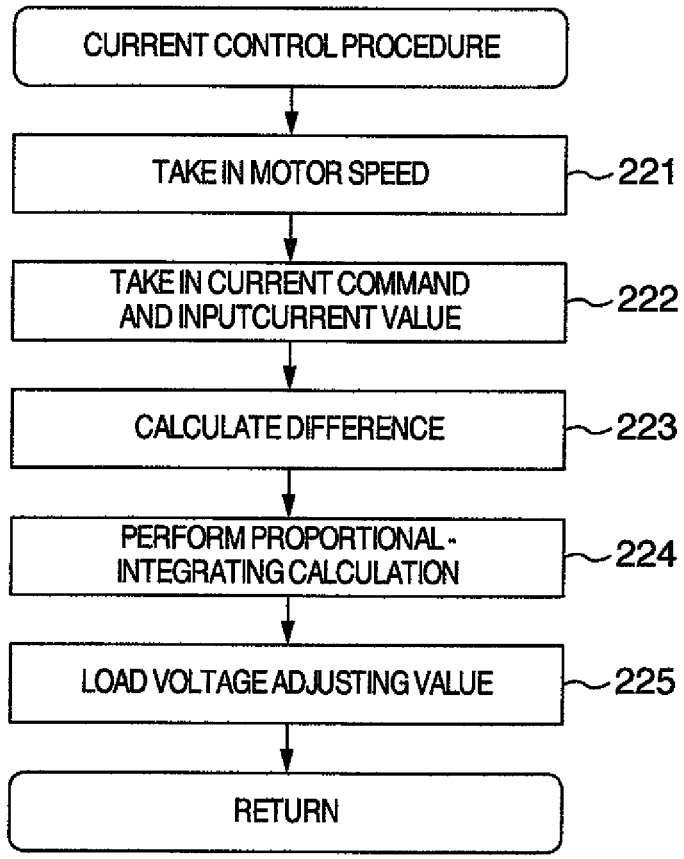
FIG. 22 is the flow chart of a current control procedure performed in the fourth embodiment of this invention.

FIG. 22 is the flow chart of a current control procedure performed in the fourth embodiment of this invention.

In this procedure, motor speed data is imported in Step 221. In Step 222, the input current command value received in the communication reception procedure and the input current value calculated in the input current import procedure 901 are read in, and the difference between the input current command value and the input current value is calculated in Step 223. In Step 224, the difference is subjected to proportional-integration calculation to determine the amplitudes of the AC voltages outputted to the three-phase inverter in such a manner that the difference approaches zero. In Step 225, the voltage adjusting value to be outputted to the drive signal generation unit 45 is calculated in accordance with the frequency data obtained in Step 221 and the amplitudes of the AC voltages obtained in Step 224, and the calculated voltage adjusting value is loaded.

As described above, according to the fourth embodiment of this invention, the input current value is calculated inside the motor housing, and the input current value and the motor speed data are transmitted through communication from inside the motor housing to outside the motor housing. Further, by receiving the input current command through communication from outside the motor housing to inside the motor housing, it is possible to accurately detect the input current value and the input current command value outside and inside the motor housing. Moreover, by performing control in such a manner that the input current value approaches the accurately detected input current command value, it becomes possible to realize a synchronous motor whose speed fluctuation can be suppressed and which can be operated with low acoustic noise.

In addition, since the fourth embodiment of this invention has the input current detection circuit 12 installed within the motor housing and also has the input current calculation unit and the communication transmission unit, it becomes possible to detect the condition of the load attached to the motor from outside the motor housing. Furthermore, according to this embodiment, it becomes possible to provide a synchronous motor which can be fabricated at low cost and which can transmit and receive plural data without increasing the number of insulating circuits for securing insulation between the inside and outside of the motor housing.

[Embodiment 5]

Figure 23:
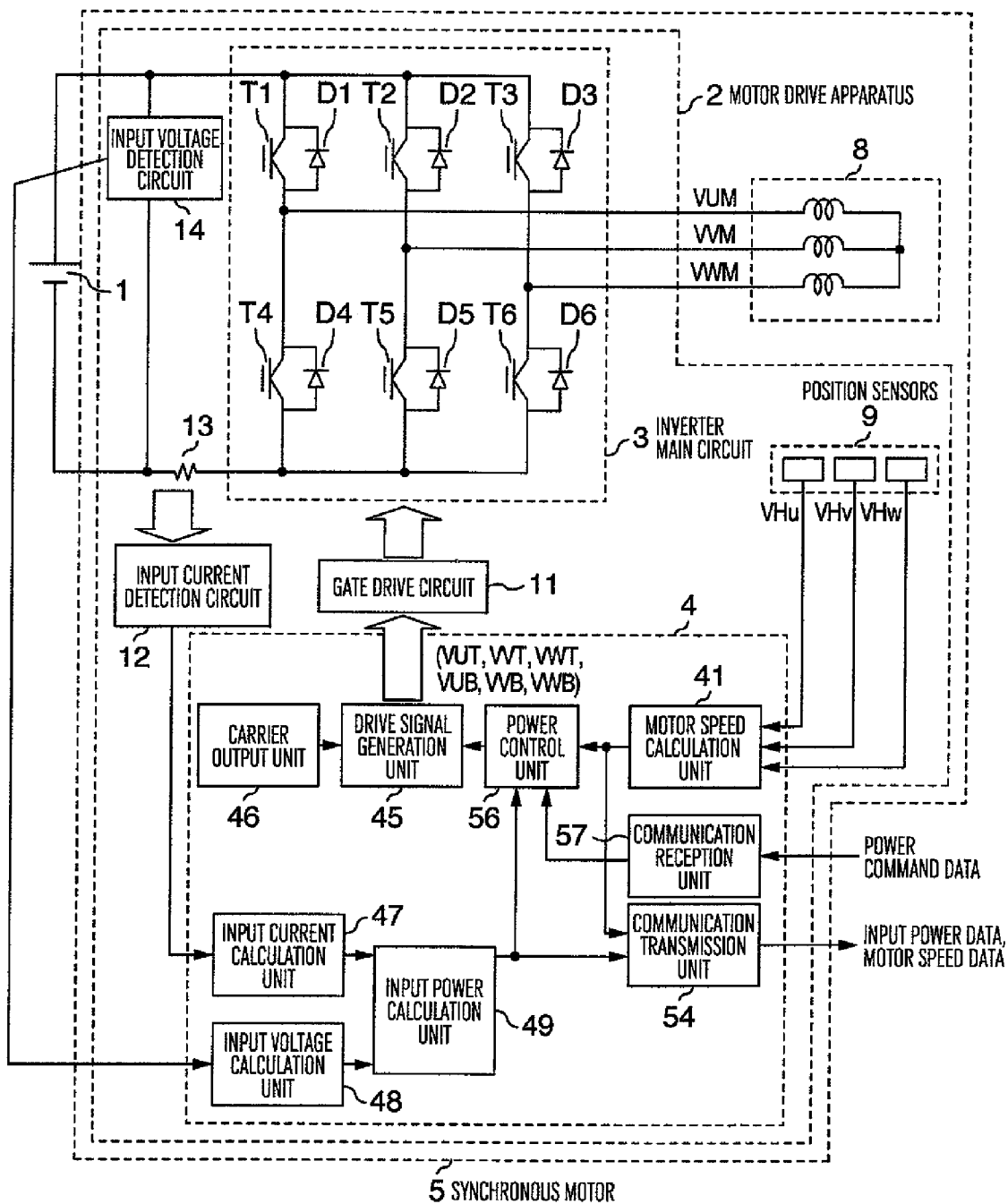
FIG. 23 shows in block diagram the overall circuit configuration of a synchronous motor as a fifth embodiment of this invention.

FIG. 23 shows in block diagram the overall circuit configuration of a synchronous motor as a fifth embodiment of this invention. In FIG. 23, constituents similar to those shown in FIG. 20 are indicated at the same reference symbols as in FIG. 20, and the description thereof will be omitted. Only constituents that operate differently will be described in the following.

This fifth embodiment differs from the fourth embodiment in that it includes a power control unit 56, a communication reception unit 57, an input voltage detection circuit 14, an input voltage calculation unit 48, an input power calculation unit 49 and a communication transmission unit 54. The input voltage detection circuit 14, the input voltage calculation unit 48, the input power calculation unit 49 and the communication transmission unit 54 were described with the second embodiment, and therefore their description is omitted.

As shown in FIG. 23, the power control unit 56 determines the amplitudes of the AC voltages outputted from the three-phase inverter in such a manner that the difference between the input power command value received by the communication reception unit 57 from outside the motor housing and the input power value calculated by the input power calculation unit 49, approaches zero.

Also, the power control unit 56 outputs to the drive signal generation unit 45 a voltage adjusting value for adjusting the frequency of the AC voltages outputted from the three-phase inverter in accordance with the motor speed obtained by the motor speed calculation unit 41.

<Control Period Interruption Procedure>

Figure 24:
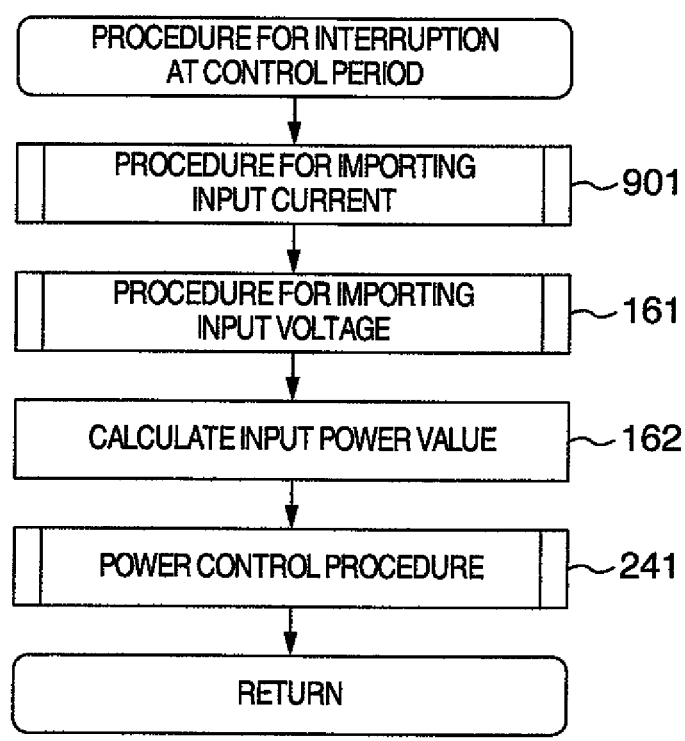
FIG. 24 is the flow chart of a control period interruption procedure performed in the fifth embodiment of this invention.

FIG. 24 is the flow chart of a control period interruption procedure performed in the fifth embodiment of this invention.

This procedure is started up as an interruption procedure initiated at the time when the control period timer overflows, or simultaneously with the position detection interruption procedure. This procedure consists of Step 901 of importing input current, i.e. the same step as described in the first embodiment, Step 161 of importing input voltage, i.e. the same step as described in the second embodiment, Step 162 of calculating input power, and Step 241 of performing power control, added in this fifth embodiment. This procedure is executed by the software for executing the function of the power control unit 56.

Figure 25:
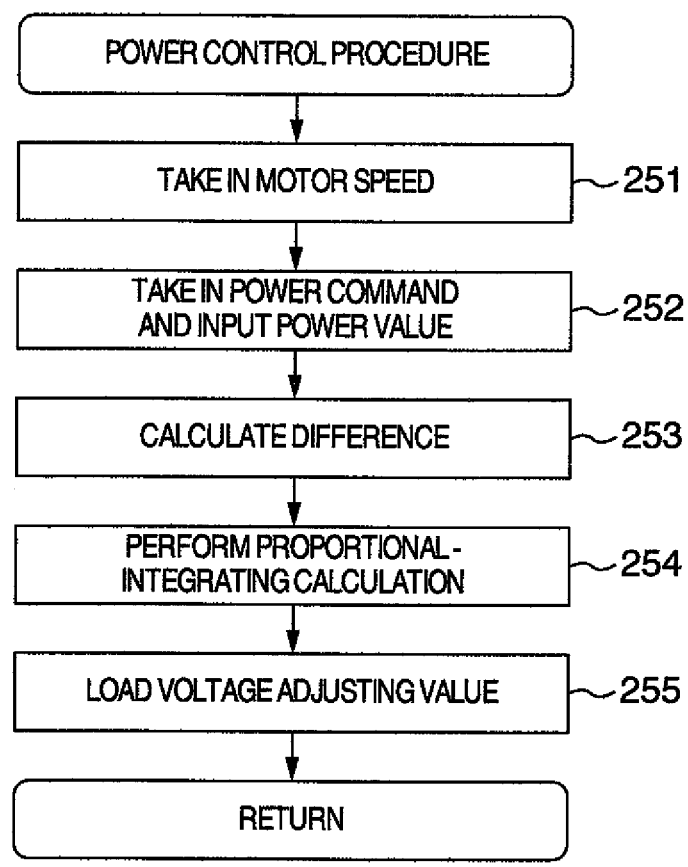
FIG. 25 is the flow chart of a power control procedure performed in the fifth embodiment of this invention.

FIG. 25 is the flow chart of a power control procedure performed in the fifth embodiment of this invention.

In this power control procedure, the motor speed data is imported in Step 251. In Step 252, the input power command value received by the communication reception unit 57 and the input power value calculated in the input power calculation step 162 are read in. In Step 253, the difference between the input power command value and the input power value is calculated. In Step 254, the calculated difference is subjected to proportional-integration calculation, and the amplitudes of the AC voltages outputted to the three-phase inverter is determined in such a manner that the difference approaches zero. In Step 255, a voltage adjusting value to be outputted to the drive signal generation unit 45 is calculated on the basis of the frequency data obtained in Step 251 and the amplitudes of the AC voltages obtained in Step 254, and the calculated voltage adjusting value is loaded.

As described above, according to the fifth embodiment of this invention, the input power value is calculated inside the motor housing, and the input power value and the motor speed data are transmitted through communication from inside the motor housing to outside the motor housing. Further, by receiving the input power command through communication from outside the motor housing to inside the motor housing, it is possible to accurately detect the input power value and the input power command value outside and inside the motor housing. Moreover, by performing control in such a manner that the input power value approaches the accurately detected input power command value, it becomes possible to realize a synchronous motor whose speed fluctuation can be suppressed and which can be operated with low acoustic noise.

In addition, since the fifth embodiment of this invention has the input current detection circuit 12 and the input voltage detection circuit 14 installed within the motor housing and also has the input current calculation unit 47, the input voltage calculation unit 48, the input power calculation unit 49 and the communication transmission unit 54, it becomes possible to detect the condition of the load attached to the motor from outside the motor housing. Furthermore, according to this embodiment, it becomes possible to provide an inexpensive synchronous motor which can transmit and receive plural data without increasing the number of insulating circuits for securing insulation between the inside and outside of the motor housing.

[Embodiment 6]

Figure 26:
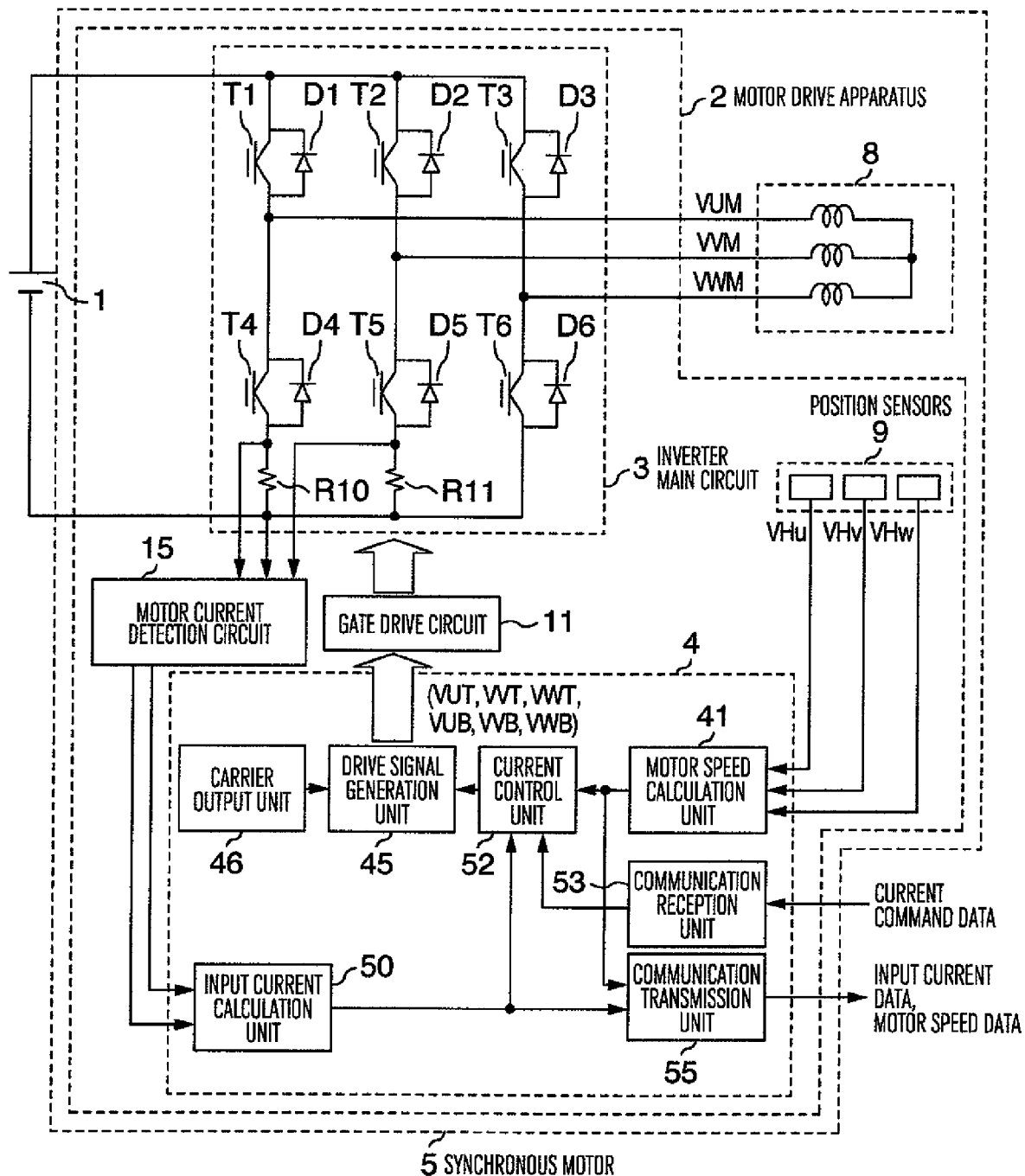
FIG. 26 shows in block diagram the overall circuit configuration of a synchronous motor as a sixth embodiment of this invention.

FIG. 26 shows in block diagram the overall circuit configuration of a synchronous motor as a sixth embodiment of this invention. In FIG. 26, constituents similar to those shown in FIG. 20 are indicated at the same reference symbols as in FIG.

20, and the description thereof will be omitted. Only constituents that operate differently will be described in the following.

The sixth embodiment differs from the fourth embodiment in that it includes a current control unit 52, a motor current detection circuit 15, an input current calculation unit 50 and a communication transmission unit 55. The motor current detection circuit 15, the input current calculation unit 50 and the communication transmission unit 55 were described with the third embodiment, and therefore their description is omitted.

As shown in FIG. 26, the current control unit 52 determines the amplitudes of the AC voltages outputted from the three-phase inverter in such a manner that the difference between the input current command value received by the communication reception unit 53 from outside the motor housing and the input current value calculated by the input current calculation unit 50, approaches zero. Also, the current control unit 52 outputs to the drive signal generation unit 45 a voltage adjusting value for adjusting the frequency of the AC voltages generated by the three-phase inverter in accordance with the motor speed obtained by the motor speed calculation unit 41.

As described above, according to the sixth embodiment of this invention, the input current value is calculated inside the motor housing, and the input current value and the motor speed data are transmitted through communication from inside the motor housing to outside the motor housing. Further, by receiving the input current command through communication from outside the motor housing to inside the motor housing, it is possible to accurately detect the input current value and the input current command outside and inside the motor housing. Moreover, by performing control in such a manner that the input current value approaches the accurately detected input current command value, it becomes possible to realize a synchronous motor whose speed fluctuation can be suppressed and which can be operated with low acoustic noise.

In addition, since the sixth embodiment of this invention has the motor current detection circuit 15 installed within the motor housing and also has the input current calculation unit 50 and the communication transmission unit 55, it becomes possible to detect the condition of the load attached to the motor from outside the motor housing. Furthermore, according to this embodiment, it becomes possible to provide an inexpensive synchronous motor which can transmit and receive plural data without increasing the number of insulating circuits for securing insulation between the inside and outside of the motor housing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A synchronous motor comprising:
a housing within which windings and a rotor of the synchronous motor are disposed, said rotor being rotatably mounted at an inner side of the winding;
a three-phase inverter for supplying three-phase AC voltages of variable amplitude and frequency to the windings on the basis of a gate drive signal from a gate drive circuit;
position sensors for detecting the magnetic poles of the synchronous motor;
a detection means for detecting input current, a value equivalent to the input current or input power and converting the input current, the value or the input power to the corresponding digital quantity;
a motor speed calculation means for digitally calculating the speed of the synchronous motor on the basis of the outputs of the position sensors;
a digital communication reception means for receiving through communication a digital speed command value, a digital input current command value or a digital input power command value from outside the synchronous motor;
a digital feedback control means for adjusting the AC voltages and frequency of the output of the three-phase inverter in such a manner that the synchronous motor speed, the input current or the input power approaches the speed command value, the input current command value or the input power command value, respectively; and
a digital communication transmission means for transmitting the digital signals representing the synchronous motor speed, the input current or the input power to outside the synchronous motor,
wherein:
the three-phase inverter, the gate drive circuit, the position sensors, the detection means, the motor speed calculation means, the digital communication reception means, the digital feedback control means, and the digital communication transmission means are disposed within the housing,
the three-phase inverter, the position sensors, the detection means, the motor speed calculation means, the digital communication reception means, the digital feedback control means, and the digital communication transmission means are disposed one substrate, and
the substrate includes a plane parallel with the rotating plane of the rotor and disposed so as to overlap a direction of a rotational axis of the rotor.

2. A synchronous motor as claimed in claim 1, comprising a microcomputer for executing the functions of all the digitally operating means.

3. A synchronous motor as claimed in claim 1, wherein
the input current detection means includes an analog input current detection circuit for detecting the input current flowing into the DC input terminal of the three-phase inverter and an input current calculation means for calculating a digital input current value on the basis of the output of the analog input current detection circuit;
the digital communication reception means includes a means for receiving the speed command value from outside the synchronous motor;
the digital feedback control means includes a speed feedback control means for adjusting the amplitudes and frequency of the AC voltages outputted by the three-phase inverter in such a manner that the speed of the synchronous motor approaches the speed command value; and
the digital communication transmission means includes a means for transmitting the input current value and the motor speed to outside the synchronous motor.

4. A synchronous motor as claimed in claim 1, wherein
the input current detection means includes an analog input current detection circuit for detecting the input current flowing into the DC input terminal of the three-phase inverter and an input current calculation means for calculating a digital input current value on the basis of the output of the analog input current detection circuit;

the synchronous motor includes an analog input voltage detection circuit for detecting the voltage developed between the DC input terminals of the three-phase inverter, an input voltage calculation means for calculating a digital input voltage value on the basis of the output of the input voltage detection circuit, and an input power calculation means for calculating an input power value on the basis of the input current value and the input voltage value; and the digital communication transmission means includes a means for transmitting the input power value and the motor speed to outside the synchronous motor.

5. A synchronous motor as claimed in claim 1, wherein
the input current detection means includes an analog motor current detection circuit for detecting the motor winding currents flowing through the windings of the synchronous motor and an input current calculation means for calculating a digital input current value on the basis of the output of the motor current detection circuit; and the digital communication transmission means includes a means for transmitting the digital input current value and the motor speed to outside the synchronous motor.

6. A synchronous motor as claimed in claim 1, wherein
the input current detection means includes an analog input current detection circuit for detecting the input current flowing into the DC input terminal of the three-phase inverter and an input current calculation means for generating a digital input current value on the basis of the output of the analog input current detection circuit;

the digital communication reception means includes a means for receiving a digital input current command value from outside the synchronous motor;

the feedback control means includes a current control means for adjusting the amplitudes and frequency of the AC voltages outputted from the three-phase inverter in such a manner that the input current value approaches the input current command value; and the digital communication transmission means includes a means for transmitting the input current value and the motor speed to outside the synchronous motor.

7. A synchronous motor as claimed in claim 1, wherein
the input current detection means includes an analog input current detection circuit for detecting the input current flowing into the DC input terminal of the three-phase inverter and an input current calculation means for generating a digital input current value on the basis of the output of the analog input current detection circuit;

the synchronous motor includes an analog input voltage detection circuit for detecting the voltage developed between the DC input terminals of the three-phase inverter, an input voltage calculation means for calculating a digital input voltage value on the basis of the output of the input voltage detection circuit, and an input power calculation means for digitally calculating an input power value on the basis of the input current value and the input voltage value;

the digital communication reception means includes a means for receiving a digital input power command value from outside the synchronous motor;

the feedback control means includes a power control means for adjusting the amplitudes and frequency of the AC voltages outputted from the three-phase inverter in such a manner that the input power value approaches the input power command value; and the digital communication transmission means includes a means for transmitting the input power value and the motor speed to outside the synchronous motor.

8. A synchronous motor as claimed in claim 1, wherein
the input current detection means includes an analog motor winding current detection circuit for detecting the motor winding currents flowing through the windings of the synchronous motor and an input current calculation means for calculating a digital input current value on the basis of the output of the motor winding current detection circuit;

the digital communication reception means includes a means for receiving a digital input current command value from outside the synchronous motor;

the feedback control means includes a current control means for adjusting the amplitudes and frequency of the AC voltages outputted from the three-phase inverter in such a manner that the input current value approaches the input current command value; and the digital communication transmission means includes a means for transmitting the input current value and the motor speed to outside the synchronous motor.

* * * * *